United States Patent
Yang et al.

(10) Patent No.: US 10,192,148 B1
(45) Date of Patent: Jan. 29, 2019

(54) MACHINE LEARNING OF WRITTEN LATIN-ALPHABET BASED LANGUAGES VIA SUPER-CHARACTER

(71) Applicant: GYRFALCON TECHNOLOGY INC., Milpitas, CA (US)

(72) Inventors: Lin Yang, Milpitas, CA (US); Patrick Z. Dong, San Jose, CA (US); Charles Jin Young, Milpitas, CA (US); Jason Z. Dong, San Jose, CA (US); Baohua Sun, Fremont, CA (US)

(73) Assignee: Gyrfalcon Technology Inc., Milpitas, CA (US)

( * ) Notice: Subject to any disclaimer, the term of this patent is extended or adjusted under 35 U.S.C. 154(b) by 0 days.

(21) Appl. No.: 16/134,807

(22) Filed: Sep. 18, 2018

Related U.S. Application Data

(63) Continuation-in-part of application No. 15/694,711, filed on Sep. 1, 2017, now Pat. No. 10,102,453, which
(Continued)

(51) Int. Cl.
*G06K 9/46* (2006.01)
*G06K 9/62* (2006.01)
*G06K 9/72* (2006.01)

(52) U.S. Cl.
CPC ........... *G06K 9/726* (2013.01); *G06K 9/4642* (2013.01); *G06K 9/6277* (2013.01)

(58) Field of Classification Search
CPC ............... G06F 17/274; G06F 17/2765; G06F 17/2863; G06F 17/2775; G06F 17/2785;
(Continued)

(56) References Cited

U.S. PATENT DOCUMENTS

| | | | | |
|---|---|---|---|---|
| 5,067,164 A | * | 11/1991 | Denker | G06K 9/4628 382/158 |
| 6,519,363 B1 | * | 2/2003 | Su | G06K 9/68 382/177 |

(Continued)

OTHER PUBLICATIONS

"Globally Trained Handwritten Word Recognizer using Spatial Representation, Convolutional Neural Networks and Hidden Markov Models"; Bengio, Yoshua; Advances in Neural Information Processing Systems 6 (Year: 1993).*
(Continued)

*Primary Examiner* — Michael S Osinski
(74) *Attorney, Agent, or Firm* — RC Patent Services

(57) ABSTRACT

A string of Latin-alphabet based language texts is received and formed a multi-layer 2-D symbol in a computing system. The received string contains at least one word with each word containing at least one letter of the Latin-alphabet based language. 2-D symbol comprises a matrix of N×N pixels of data representing a super-character. The matrix is divided into M×M sub-matrices. Each sub-matrix represents one ideogram formed from the at least one letter contained in a corresponding word in the received string. Ideogram has a square format with a dimension EL letters by EL letters (i.e., row and column). EL is determined from the total number of letters (LL) contained in the corresponding word. EL, LL, N and M are positive integers. Super-character represents a meaning formed from a specific combination of at least one ideogram. Meaning of the super-character is learned with image classification of the 2-D symbol.

15 Claims, 31 Drawing Sheets

Related U.S. Application Data is a continuation-in-part of application No. 15/683,723, filed on Aug. 22, 2017.

(58) Field of Classification Search
CPC .... G06F 17/28; G06F 17/30705; G06F 17/21; G06F 17/2872; G06F 17/2881; G06F 17/30253; G06F 17/30256; G06F 17/30684; G06K 9/18; G06K 9/5158; G06K 9/55; G06K 9/00872; G06K 9/4676; G06N 3/0481; G06N 3/08
See application file for complete search history.

(56) References Cited

U.S. PATENT DOCUMENTS

| | | | | |
|---|---|---|---|---|
| 6,665,436 | B2* | 12/2003 | Su | G06K 9/68 382/177 |
| 6,941,513 | B2* | 9/2005 | Meystel | G06F 17/279 715/256 |
| 8,321,222 | B2* | 11/2012 | Pollet | G10L 13/07 379/88.03 |
| 8,726,148 | B1* | 5/2014 | Battilana | G06F 17/273 715/234 |
| 9,026,432 | B2* | 5/2015 | Zangvil | G06F 17/273 704/10 |
| 2003/0108239 | A1* | 6/2003 | Su | G06K 9/68 382/177 |
| 2003/0110035 | A1* | 6/2003 | Thong | G10L 15/083 704/254 |
| 2008/0130996 | A1* | 6/2008 | Sternby | G06K 9/00416 382/179 |
| 2009/0048841 | A1* | 2/2009 | Pollet | G10L 13/07 704/260 |
| 2010/0158394 | A1* | 6/2010 | Chang | G06F 17/30985 382/219 |
| 2010/0286979 | A1* | 11/2010 | Zangvil | G06F 17/273 704/9 |
| 2013/0002553 | A1* | 1/2013 | Colley | G06F 3/0236 345/161 |
| 2013/0060786 | A1* | 3/2013 | Serrano | G06F 17/30277 707/749 |
| 2014/0040270 | A1* | 2/2014 | O'Sullivan | G06F 17/30702 707/739 |
| 2014/0355835 | A1* | 12/2014 | Rodriguez-Serrano | G06K 9/72 382/105 |
| 2015/0193431 | A1* | 7/2015 | Stoytchev | G06F 19/18 704/9 |
| 2017/0004184 | A1* | 1/2017 | Jain | G06F 17/2735 |
| 2017/0011279 | A1* | 1/2017 | Soldevila | G06K 9/66 |
| 2017/0032035 | A1* | 2/2017 | Gao | G06N 3/08 |
| 2017/0177710 | A1* | 6/2017 | Burlik | G06F 17/30401 |
| 2018/0060302 | A1* | 3/2018 | Liang | G06F 17/277 |
| 2018/0150457 | A9* | 5/2018 | Stoytchev | G06F 19/18 |
| 2018/0150956 | A1* | 5/2018 | Kao | G06T 7/11 |

OTHER PUBLICATIONS

"Convolutional Neural Network Committees for Handwritten Character Classification"; Ciresan, Dan Claudiu; 2011 International Conference on Document Analysis and Recognition (Year: 2011).*

"Discriminative quadratic feature learning for handwritten Chinese character recognition"; Zhou, Ming-Ke; Patern Recognition, vol. 49, pp. 7-18, Jan. 2016 (Year: 2016).*

"Chinese Character CAPTCHA Recognition and performance estimation via deep neural network"; Lin, Dazhen; Neurocomputing, vol. 288, May 2, 2018, pp. 11-19 (Year: 2018).*

"Ideogram Identification in a Realtime Traffic Sign Recognition System"; Priese, L.; Proceedings of the Intelligent Vehicles '95. Symposium; Sep. 1995 (Year: 1995).*

"Neural Network Recognition and Analysis of Hand-printed Characters"; Singh, S.; 1998 IEEE International Joint Conference on Neural Networks Proceedings. IEEE World Congress on Computational Intelligence (Cat. No. 98CH36227); May 1998 (Year: 1998).*

"Handwritten Characters Classification Using Neural Networks and Moments Features"; Abaynarh, Mohamed; International Journal of Modern Engineering Research, vol. 2, Issue.5, Sep-Oct. 2012 pp. 3572-3577 (Year: 2012).*

Shur et al. "A Corpus of Natural Language for Visual Reasoning", 2017, Facebook AI Research, Menlo Park, CA.

Yoon Kim, "Convolutional Neural Networks for Sentence Classification", Sep. 2014, New York University.

Rastegari et al. "XNOR-Net: ImageNet Classification Using Binary Convolutional Neural Networks", Aug. 2, 2016, Allen Institute for AI, Univ. of Washington.

Gysel et al. "Hardware-Oriented Approximation of Convolutional Neural Networks", Oct. 20, 2016, Department of Electrical and Computer Engineering, University of California, Davis, CA.

USPTO Office Action for U.S. Appl. No. 15/694,711 (parent of instant applicatio) dated Aug. 3, 2018.

* cited by examiner

301

302

303

304

326

327

328

331

332

333

341

342

343 the kind of sense of humor that derives from a workman's grasp of pun and entendre and its attendant need to constantly draw attention to itself.

562

564

MACHINE LEARNING OF WRITTEN LATIN-ALPHABET BASED LANGUAGES VIA SUPER-CHARACTER

CROSS-REFERENCE TO RELATED APPLICATIONS

This application is a continuation-in-part (CIP) to a co-pending U.S. patent application Ser. No. 12/694,711 for "Natural Language Processing Via A Two-dimensional Symbol Having Multiple Ideograms Contained Therein" filed on Sep. 1, 2017, which is a CIP to a co-pending U.S. patent application Ser. No. 15/683,723 for "Two-dimensional Symbols For Facilitating Machine Learning Of Combined Meaning Of Multiple Ideograms Contained Therein" filed on Aug. 22, 2017. All of which are hereby incorporated by reference in their entirety for all purposes.

FIELD

The invention generally relates to the field of machine learning and more particularly to machine learning of written Latin-alphabet based languages via super-character, which is a two-dimension symbol having multiple ideograms contained therein.

BACKGROUND

The Latin or Roman alphabet is the writing system originally used by the ancient Romans to write the Latin language. Due to its use in writing Germanic, Romance, and other languages first in Europe and then in other parts of the world and due to its use in Romanizing writing of other languages, it has become widespread globally. It is also used officially in China (separate from its ideographic writing) and has been semi-adopted by Slavic (Russia) and Baltic states. The Latin alphabet evolved from the visually similar Cumaean Greek version of the Greek alphabet, which was itself descended from the Phoenician abjad, which in turn derived from Egyptian hieroglyphics. The Etruscans, who ruled early Rome, adopted the Cumaean Greek alphabet, which was modified over time to become the Etruscan alphabet, which was in turn adopted and further modified by the Romans to produce the Latin alphabet.

Examples of Latin-alphabet based languages include, but are not limited to, English, German, Dutch, Danish, Swedish, Norwegian, French, Spanish, Portuguese, Italian, etc. The International Organization for Standardization (ISO) Latin alphabet contains two set of twenty-six letters (i.e., A-Z, a-z).

In written language, a logogram or logograph is a written character that represents a word or phrase. Chinese characters (including Japanese kanji) are logograms; some Egyptian hieroglyphs and some graphemes in cuneiform script are also logograms. The use of logograms in writing is called logography. A writing system that is based on logograms is called a logographic system.

An ideogram is a graphic symbol that represents an idea or concept. Some ideograms are comprehensible only by familiarity with prior convention; others convey their meaning through pictorial resemblance to a physical object.

Machine learning is an application of artificial intelligence. In machine learning, a computer or computing device is programmed to think like human beings so that the computer may be taught to learn on its own. The development of neural networks has been key to teaching computers to think and understand the world in the way human beings do. One particular implementation is referred to as Cellular Neural Networks or Cellular Nonlinear Networks (CNN) based computing system. CNN based computing system has been used in many different fields and problems including, but not limited to, image processing.

SUMMARY

This section is for the purpose of summarizing some aspects of the invention and to briefly introduce some preferred embodiments. Simplifications or omissions in this section as well as in the abstract and the title herein may be made to avoid obscuring the purpose of the section. Such simplifications or omissions are not intended to limit the scope of the invention.

Methods of machine learning of written Latin-alphabet based languages are disclosed. According to one aspect of the disclosure, a string of Latin-alphabet based language texts is received and formed a multi-layer two-dimensional (2-D) symbol in a first computing system having at least one application module installed thereon. The received string contains at least one word with each word formed by at least one letter of the Latin-alphabet based language. The 2-D symbol comprises a matrix of N×N pixels of data representing a super-character. The matrix is divided into M×M sub-matrices with each sub-matrix containing (N/M)×(N/M) pixels. Each sub-matrix represents one ideogram that is formed from the at least one letter contained in a corresponding word in the received string. Each ideogram has a square format with a dimension EL letters by EL letters (i.e., row and column). EL is determined from the total number of letters (LL) contained in the corresponding word. EL, LL, N and M are positive integers, and N is preferably a multiple of M. Super-character represents a meaning formed from a specific combination of a plurality of ideograms. The meaning of the super-character is learned in a second computing system by using an image processing technique to classify the 2-D symbol, which is formed in the first computing system and transmitted to the second computing system. Image process technique includes predefining a set of categories and determining a probability for associating each of the predefined categories with the meaning of the super-character as a result.

One of the objectives, features and advantages of the invention is to use a multi-layer 2-D symbol for representing more than individual ideogram, logosyllabic script or character. Such a multi-layer 2-D symbol facilitates a CNN based computing system to learn the meaning of a specific combination of a plurality of ideograms contained in a super-character using image processing techniques, e.g., convolutional neural networks, recurrent neural networks, etc.

Other objects, features, and advantages of the invention will become apparent upon examining the following detailed description of an embodiment thereof, taken in conjunction with the attached drawings.

BRIEF DESCRIPTION OF THE DRAWINGS

These and other features, aspects, and advantages of the invention will be better understood with regard to the following description, appended claims, and accompanying drawings as follows:

DETAILED DESCRIPTIONS

In the following description, numerous specific details are set forth in order to provide a thorough understanding of the invention. However, it will become obvious to those skilled in the art that the invention may be practiced without these specific details. The descriptions and representations herein are the common means used by those experienced or skilled in the art to most effectively convey the substance of their work to others skilled in the art. In other instances, well-known methods, procedures, and components have not been described in detail to avoid unnecessarily obscuring aspects of the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Used herein, the terms "vertical", "horizontal", "diagonal", "left", "right", "top", "bottom", "column", "row", "diagonally" are intended to provide relative positions for the purposes of description, and are not intended to designate an absolute frame of reference. Additionally, used herein, term "character" and "script" are used interchangeably.

Embodiments of the invention are discussed herein with reference to FIGS. 1-15. However, those skilled in the art will readily appreciate that the detailed description given herein with respect to these figures is for explanatory purposes as the invention extends beyond these limited embodiments.

Figure 1:
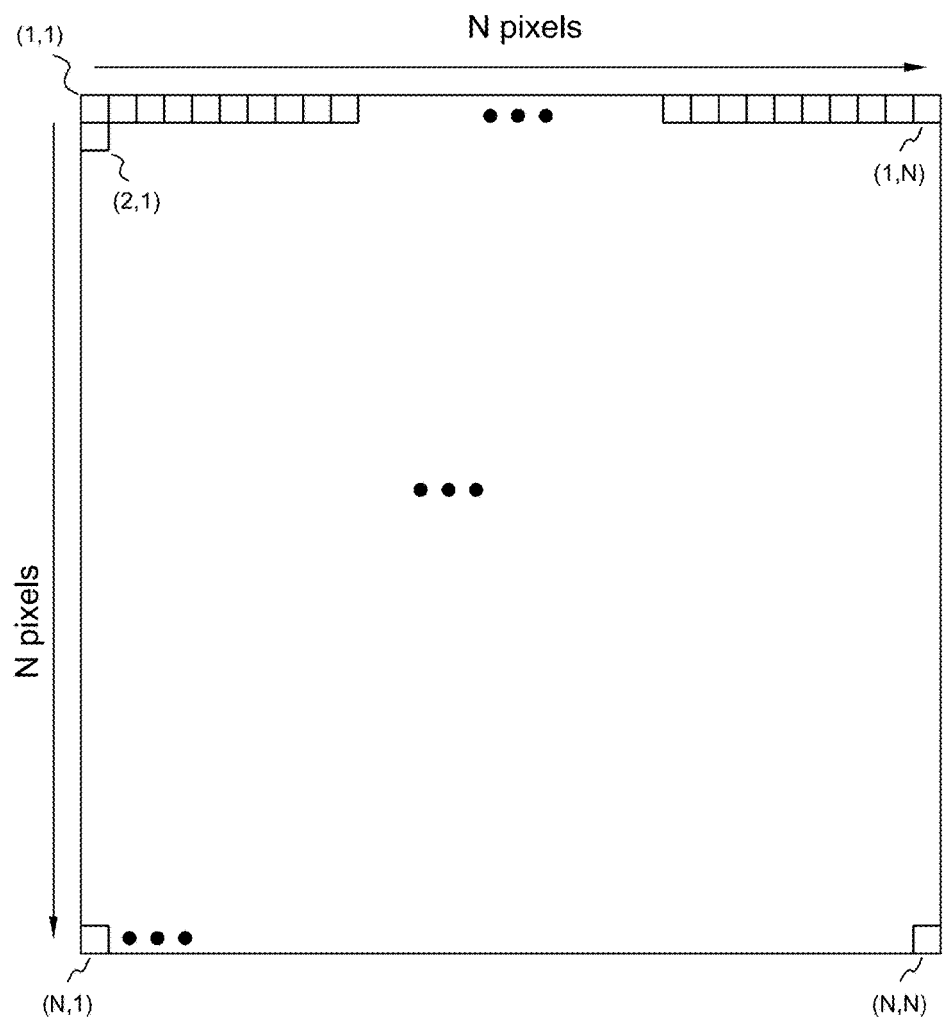
FIG. 1 is a diagram illustrating an example two-dimensional symbol comprising a matrix of N×N pixels of data that represents a super-character for facilitating machine learning of a combined meaning of multiple ideograms contained therein according to an embodiment of the invention.

Referring first to FIG. 1, it is shown a diagram showing an example two-dimensional symbol 100 for facilitating machine learning of a combined meaning of multiple ideograms contained therein. The two-dimensional symbol 100 comprises a matrix of N×N pixels (i.e., N columns by N rows) of data containing a super-character. Pixels are ordered with row first and column second as follows: (1,1), (1,2), (1,3), ... (1,N), (2,1), ..., (N,1), (N,N). N is a positive integer or whole number, for example in one embodiment, N is equal to 224.

Super-character represents at least one meaning each formed with a specific combination of a plurality of ideograms. Since an ideogram can be represented in a certain size matrix of pixels, two-dimensional symbol 100 is divided into M×M sub-matrices. Each of the sub-matrices represents one ideogram, which is defined in an ideogram collection set by humans. Super-character contains a minimum of two and a maximum of M×M ideograms. Both N and M are positive integers or whole numbers, and N is preferably a multiple of M.

Figure 2A:
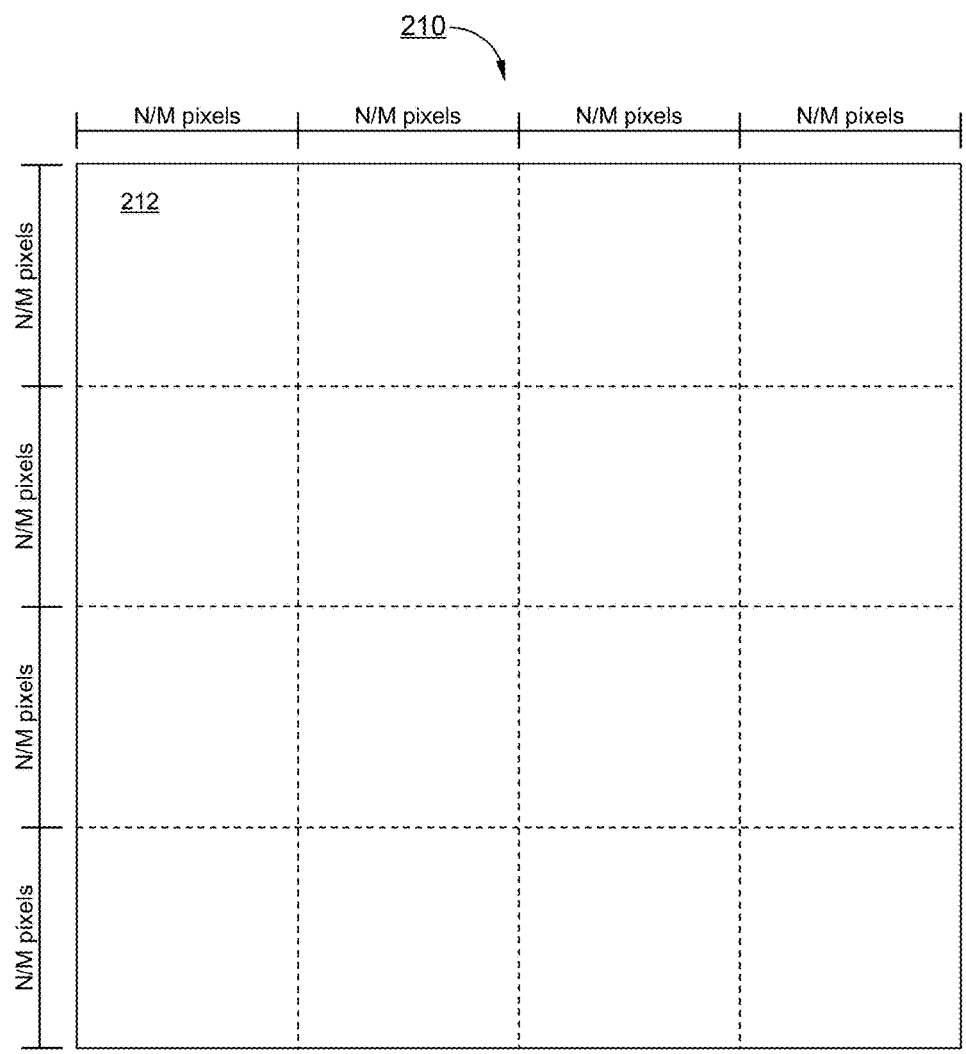
FIGS. 2A-2B are diagrams showing example partition schemes for dividing the two-dimensional symbol of FIG. 1 in accordance with embodiments of the invention.

Shown in FIG. 2A, it is a first example partition scheme 210 of dividing a two-dimension symbol into M×M sub-matrices 212. M is equal to 4 in the first example partition scheme. Each of the M×M sub-matrices 212 contains (N/M)×(N/M) pixels. When N is equal to 224, each sub-matrix contains 56×56 pixels and there are 16 sub-matrices.

Figure 2B:
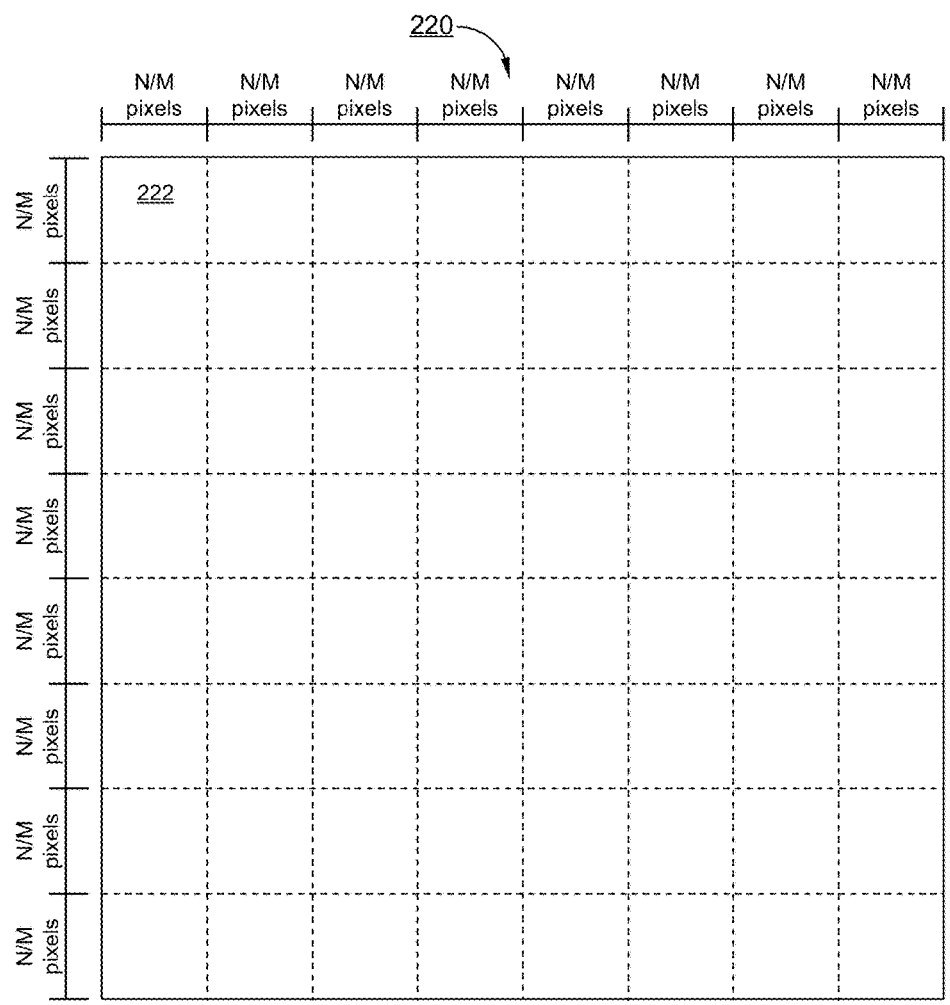

A second example partition scheme 220 of dividing a two-dimension symbol into M×M sub-matrices 222 is shown in FIG. 2B. M is equal to 8 in the second example partition scheme. Each of the M×M sub-matrices 222 contains (N/M)×(N/M) pixels. When N is equal to 224, each sub-matrix contains 28×28 pixels and there are 64 sub-matrices.

Figure 3A:
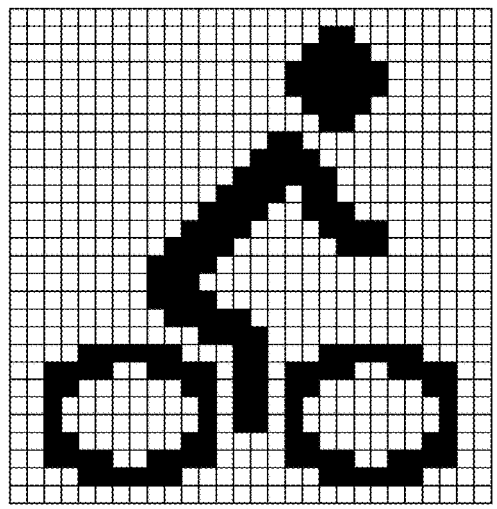
FIGS. 3A-3B show example ideograms in accordance with an embodiment of the invention.
Figure 3A:
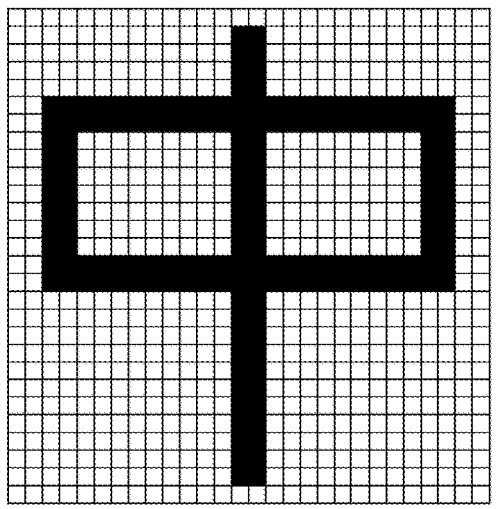
Figure 3A:
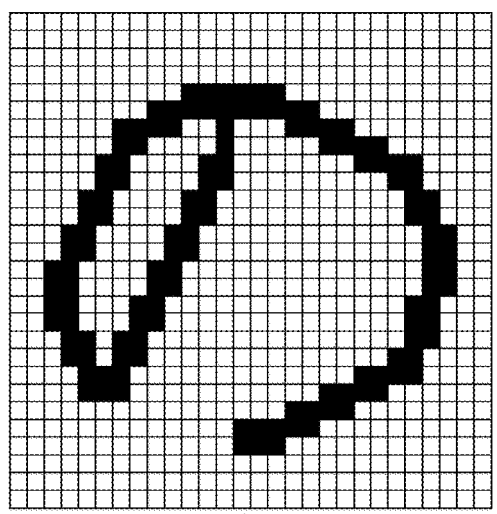
Figure 3A:
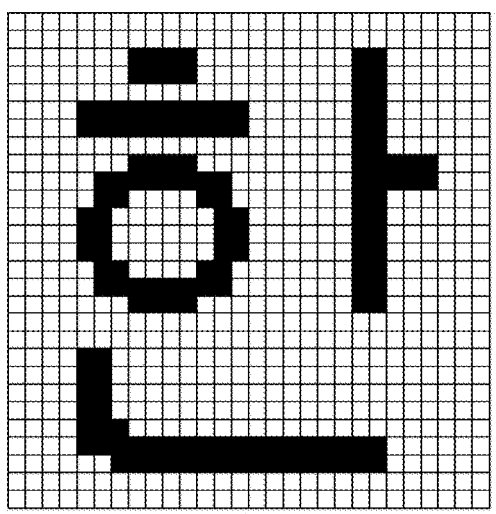

FIG. 3A shows example ideograms 301-304 that can be represented in a sub-matrix 222 (i.e., 28×28 pixels). For those having ordinary skill in the art would understand that the sub-matrix 212 having 56×56 pixels can also be adapted for representing these ideograms. The first example ideogram 301 is a pictogram representing an icon of a person riding a bicycle. The second example ideogram 302 is a logosyllabic script or character representing an example Chinese character. The third example ideogram 303 is a logosyllabic script or character representing an example Japanese character and the fourth example ideogram 304 is a logosyllabic script or character representing an example Korean character. Additionally, ideogram can also be punctuation marks, numerals or special characters. In another embodiment, pictogram may contain an icon of other images. Icon used herein in this document is defined by humans as a sign or representation that stands for its object by virtue of a resemblance or analogy to it.

Figure 3B:
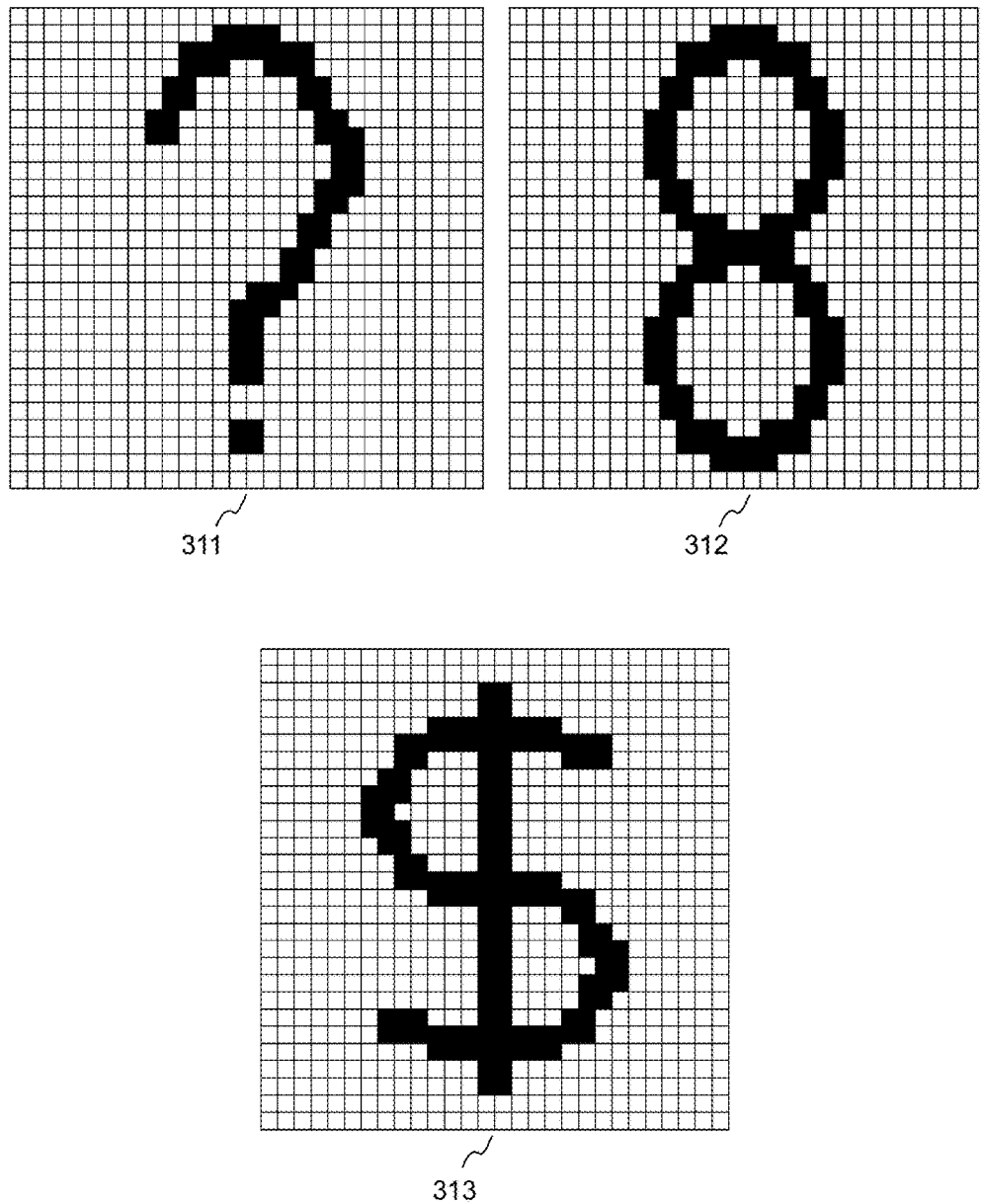
Figure 3C:
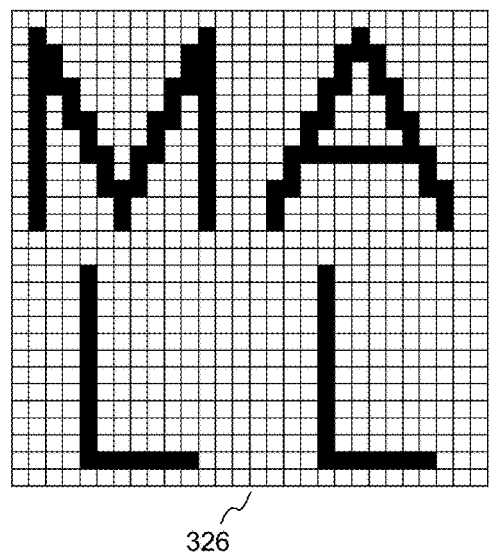
FIG. 3C shows example pictograms containing western languages based on Latin letters in accordance with an embodiment of the invention.
Figure 3C:
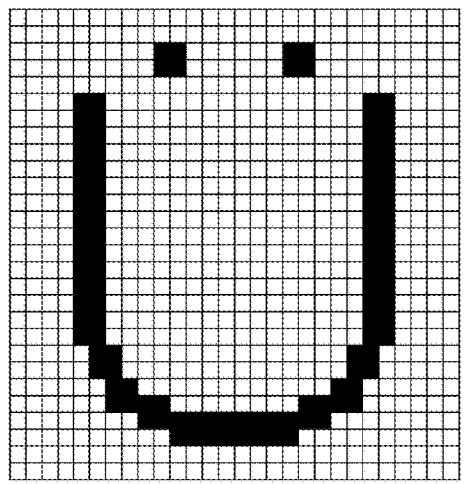
Figure 3C:
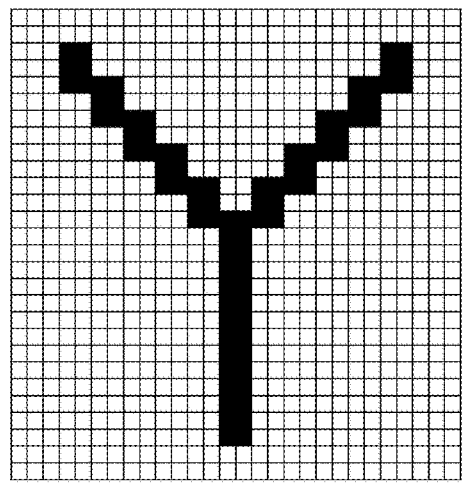

FIG. 3B shows several example ideograms representing: a punctuation mark 311, a numeral 312 and a special character 313. Furthermore, pictogram may contain one or more words of western languages based on Latin letters, for example, English, Spanish, French, German, etc. FIG. 3C shows example pictograms containing western languages based on Latin letters. The first example pictogram 326 shows an English word "MALL". The second example pictogram 327 shows a Latin letter "U" and the third example pictogram 328 shows English alphabet "Y". Ideogram can be any one of them, as long as the ideogram is defined in the ideogram collection set by humans.

Only limited number of features of an ideogram can be represented using one single two-dimensional symbol. For example, features of an ideogram can be black and white when data of each pixel contains one-bit. Feature such as grayscale shades can be shown with data in each pixel containing more than one-bit.

Additional features are represented using two or more layers of an ideogram. In one embodiment, three respective basic color layers of an ideogram (i.e., red, green and blue) are used collectively for representing different colors in the ideogram. Data in each pixel of the two-dimensional symbol contains a K-bit binary number. K is a positive integer or whole number. In one embodiment, K is 5.

Figure 3D:
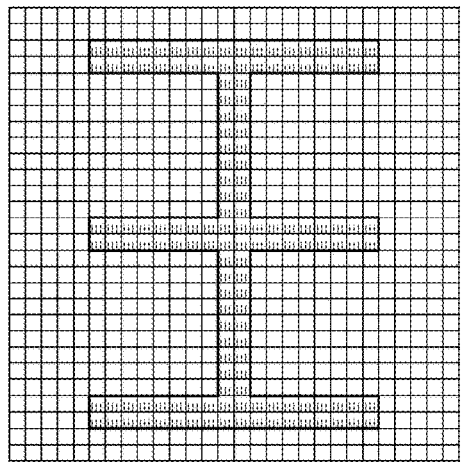
FIG. 3D shows three respective basic color layers of an example ideogram in accordance with an embodiment of the invention.
Figure 3D:
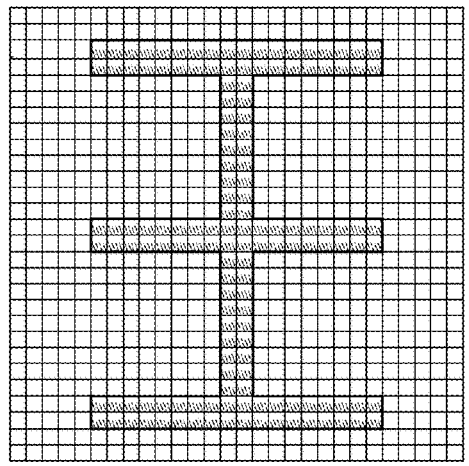
Figure 3D:
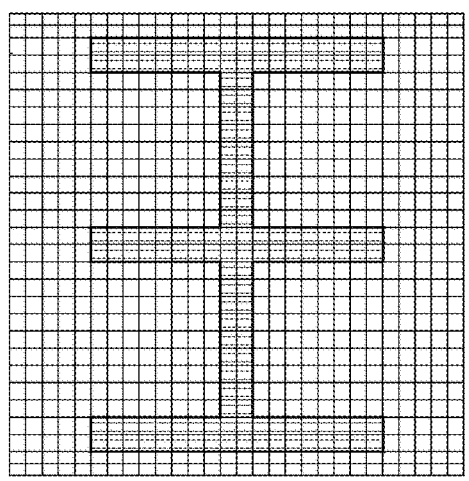

FIG. 3D shows three respective basic color layers of an example ideogram. Ideogram of a Chinese character are shown with red 331, green 332 and blue 333. With different combined intensity of the three basic colors, a number of color shades can be represented. Multiple color shades may exist within an ideogram.

Figure 3E:
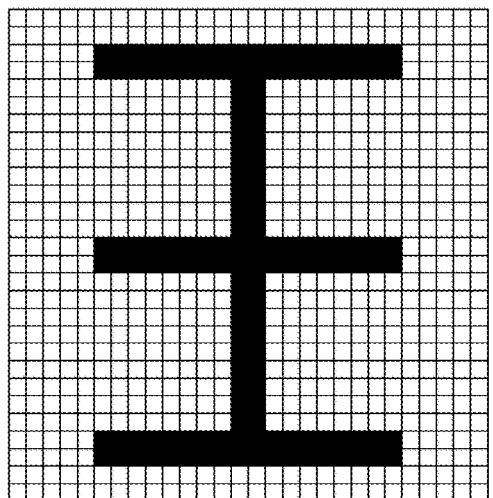
FIG. 3E shows three related layers of an example ideogram for dictionary-like definition in accordance with an embodiment of the invention.
Figure 3E:
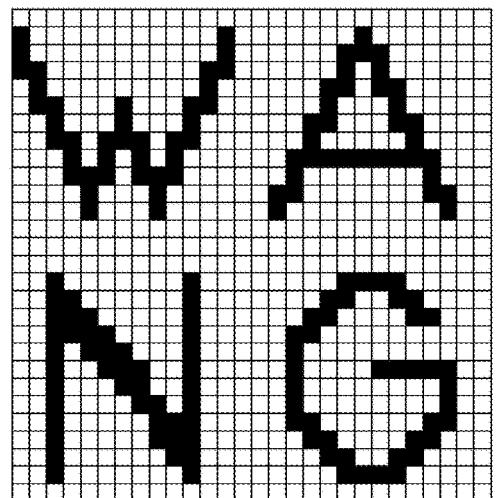
Figure 3E:
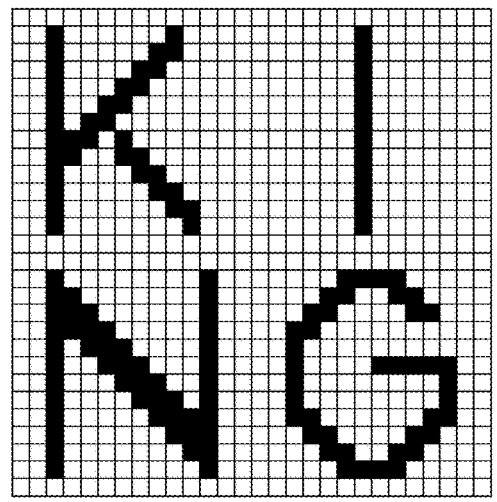

In another embodiment, three related ideograms are used for representing other features such as a dictionary-like definition of a Chinese character shown in FIG. 3E. There are three layers for the example ideogram in FIG. 3E: the first layer 341 showing a Chinese logosyllabic character, the second layer 342 showing the Chinese "pinyin" pronunciation as "wang", and the third layer 343 showing the meaning in English as "king".

Ideogram collection set includes, but is not limited to, pictograms, icons, logos, logosyllabic characters, punctuation marks, numerals, special characters. Logosyllabic characters may contain one or more of Chinese characters, Japanese characters, Korean characters, etc.

In order to systematically include Chinese characters, a standard Chinese character set (e.g., GB18030) may be used as a start for the ideogram collection set. For including Japanese and Korean characters, CJK Unified Ideographs may be used. Other character sets for logosyllabic characters or scripts may also be used.

A specific combined meaning of ideograms contained in a super-character is a result of using image processing techniques in a Cellular Neural Networks or Cellular Non-linear Networks (CNN) based computing system. Image processing techniques include, but are not limited to, convolutional neural networks, recurrent neural networks, etc.

Super-character represents a combined meaning of at least two ideograms out of a maximum of M×M ideograms. In one embodiment, a pictogram and a Chinese character are combined to form a specific meaning. In another embodiment, two or more Chinese characters are combined to form a meaning. In yet another embodiment, one Chinese character and a Korean character are combined to form a meaning. There is no restriction as to which two or more ideograms to be combined.

Ideograms contained in a two-dimensional symbol for forming super-character can be arbitrarily located. No specific order within the two-dimensional symbol is required. Ideograms can be arranged left to right, right to left, top to bottom, bottom to top, or diagonally.

Using written Chinese language as an example, combining two or more Chinese characters may result in a super-character including, but not limited to, phrases, idioms, proverbs, poems, sentences, paragraphs, written passages, articles (i.e., written works). In certain instances, the super-character may be in a particular area of the written Chinese language. The particular area may include, but is not limited to, certain folk stories, historic periods, specific background, etc.

Figure 4A:
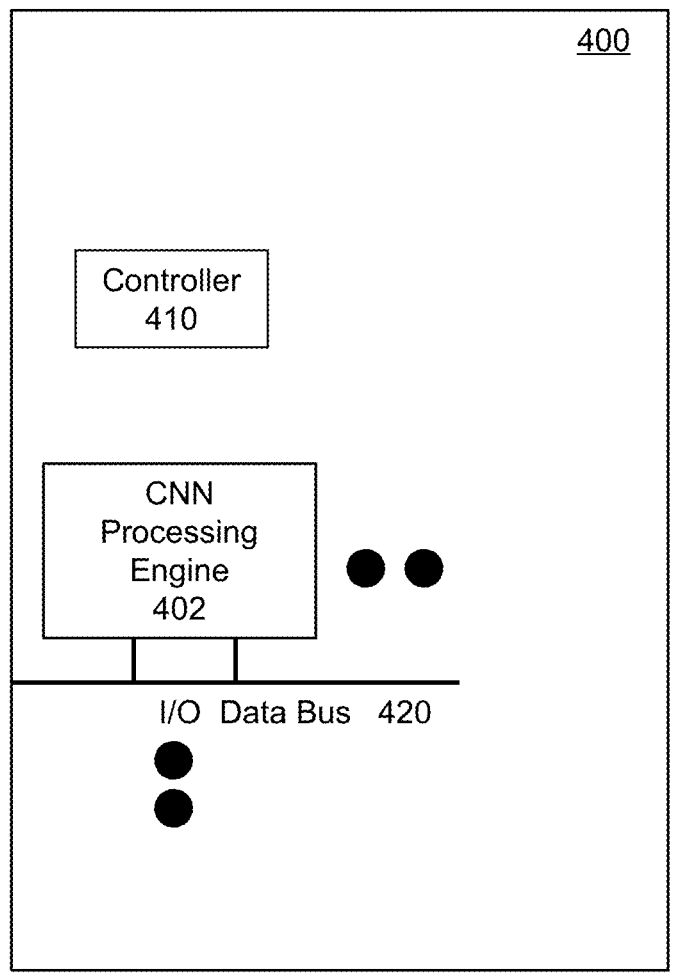
FIG. 4A is a block diagram illustrating an example Cellular Neural Networks or Cellular Nonlinear Networks (CNN) based computing system for machine learning of a combined meaning of multiple ideograms contained in a two-dimensional symbol, according to one embodiment of the invention.

Referring now to FIG. 4A, it is shown a block diagram illustrating an example CNN based computing system 400 configured for machine learning of a combined meaning of multiple ideograms contained in a two-dimensional symbol (e.g., the two-dimensional symbol 100).

The CNN based computing system 400 may be implemented on integrated circuits as a digital semi-conductor chip (e.g., a silicon substrate) and contains a controller 410, and a plurality of CNN processing units 402*a*-402*b* operatively coupled to at least one input/output (I/O) data bus 420. Controller 410 is configured to control various operations of the CNN processing units 402*a*-402*b*, which are connected in a loop with a clock-skew circuit.

In one embodiment, each of the CNN processing units 402*a*-402*b* is configured for processing imagery data, for example, two-dimensional symbol 100 of FIG. 1.

To store an ideogram collection set, one or more storage units operatively coupled to the CNN based computing system 400 are required. Storage units (not shown) can be located either inside or outside the CNN based computing system 400 based on well known techniques.

Super-character may contain more than one meanings in certain instances. Super-character can tolerate certain errors that can be corrected with error-correction techniques. In other words, the pixels represent ideograms do not have to be exact. The errors may have different causes, for example, data corruptions, during data retrieval, etc.

Figure 4B:
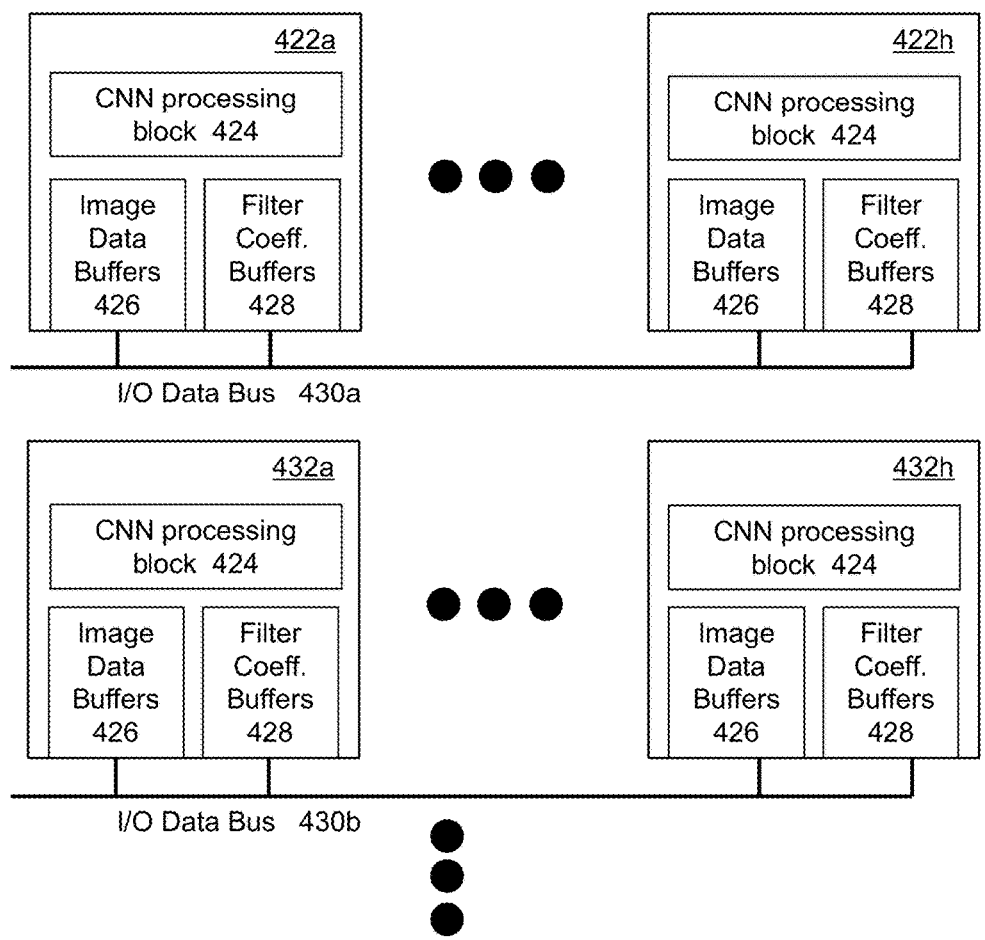
FIG. 4B is a block diagram illustrating an example CNN based integrated circuit for performing image processing based on convolutional neural networks, according to one embodiment of the invention.

In another embodiment, the CNN based computing system is a digital integrated circuit that can be extendable and scalable. For example, multiple copies of the digital integrated circuit may be implemented on a single semi-conductor chip as shown in FIG. 4B.

All of the CNN processing engines are identical. For illustration simplicity, only few (i.e., CNN processing engines 422a-422h, 432a-432h) are shown in FIG. 4B. The invention sets no limit to the number of CNN processing engines on a digital semi-conductor chip.

Each CNN processing engine 422a-422h, 432a-432h contains a CNN processing block 424, a first set of memory buffers 426 and a second set of memory buffers 428. The first set of memory buffers 426 is configured for receiving imagery data and for supplying the already received imagery data to the CNN processing block 424. The second set of memory buffers 428 is configured for storing filter coefficients and for supplying the already received filter coefficients to the CNN processing block 424. In general, the number of CNN processing engines on a chip is $2^n$, where n is an integer (i.e., 0, 1, 2, 3, . . . ). As shown in FIG. 4B, CNN processing engines 422a-422h are operatively coupled to a first input/output data bus 430a while CNN processing engines 432a-432h are operatively coupled to a second input/output data bus 430b. Each input/output data bus 430a-430b is configured for independently transmitting data (i.e., imagery data and filter coefficients). In one embodiment, the first and the second sets of memory buffers comprise random access memory (RAM), which can be a combination of one or more types, for example, Magnetic Random Access Memory, Static Random Access Memory, etc. Each of the first and the second sets are logically defined. In other words, respective sizes of the first and the second sets can be reconfigured to accommodate respective amounts of imagery data and filter coefficients.

The first and the second I/O data bus 430a-430b are shown here to connect the CNN processing engines 422a-422h, 432a-432h in a sequential scheme. In another embodiment, the at least one I/O data bus may have different connection scheme to the CNN processing engines to accomplish the same purpose of parallel data input and output for improving performance.

Figure 5A:
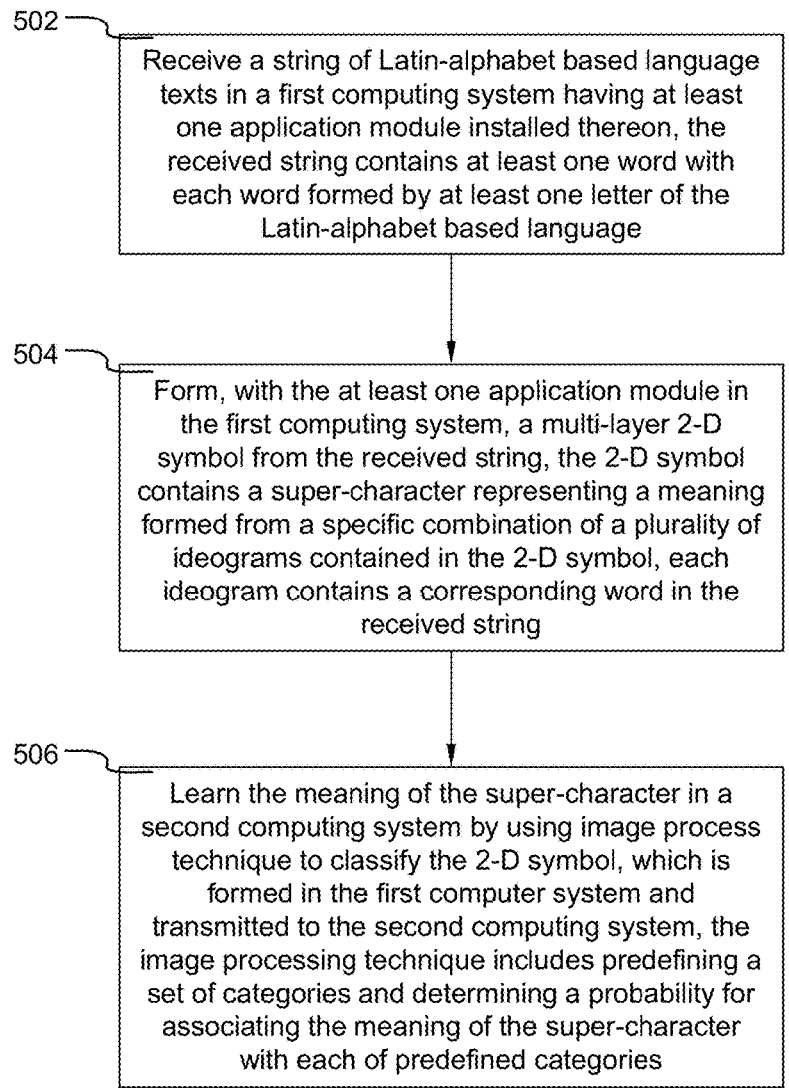
FIG. 5A is a flowchart illustrating an example process of machine learning of written Latin-alphabet based languages using a multi-layer two-dimensional symbol in accordance with an embodiment of the invention.
Figure 5B:
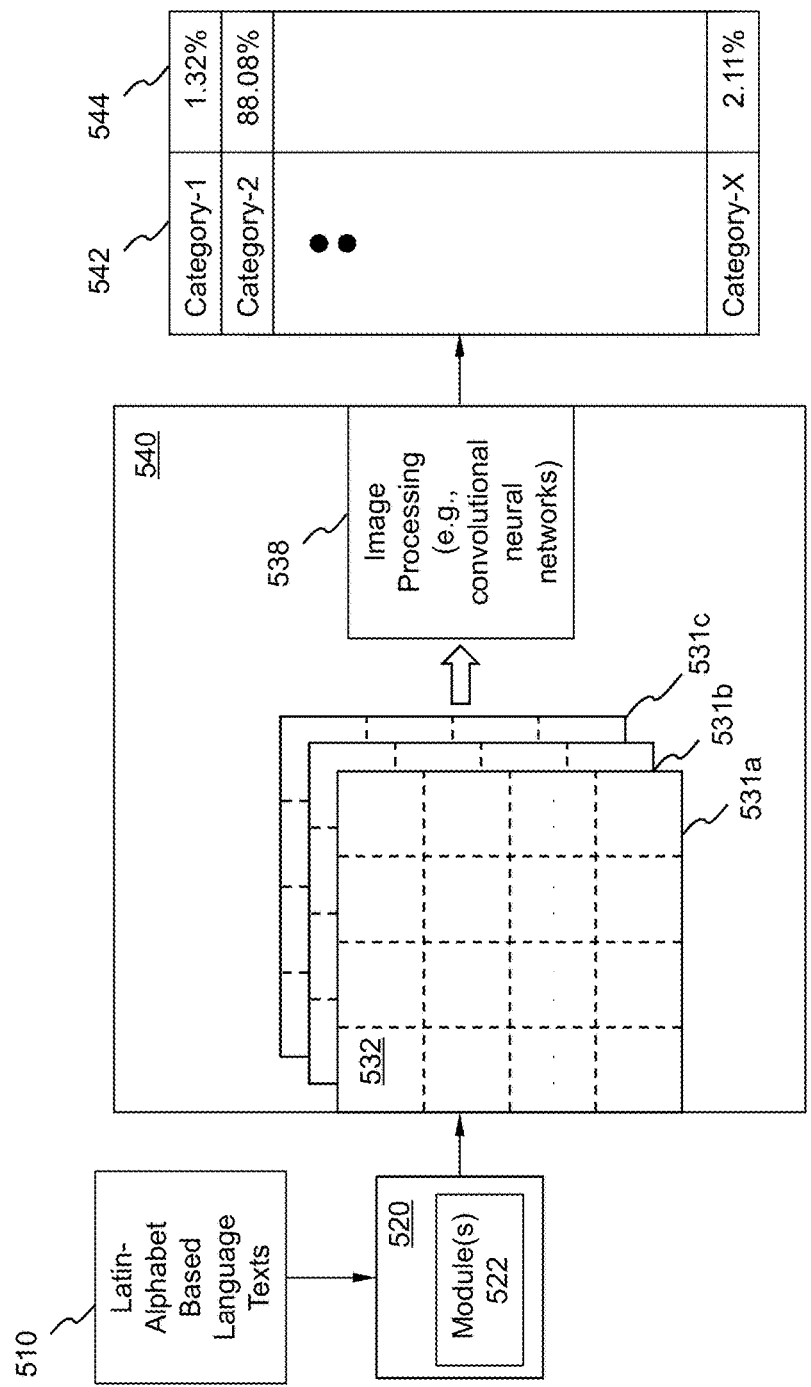
FIG. 5B is a schematic diagram showing an example Latin-alphabet based language processing via a multi-layer two-dimensional symbol with image processing technique in accordance with an embodiment of the invention.
Figure 5C:
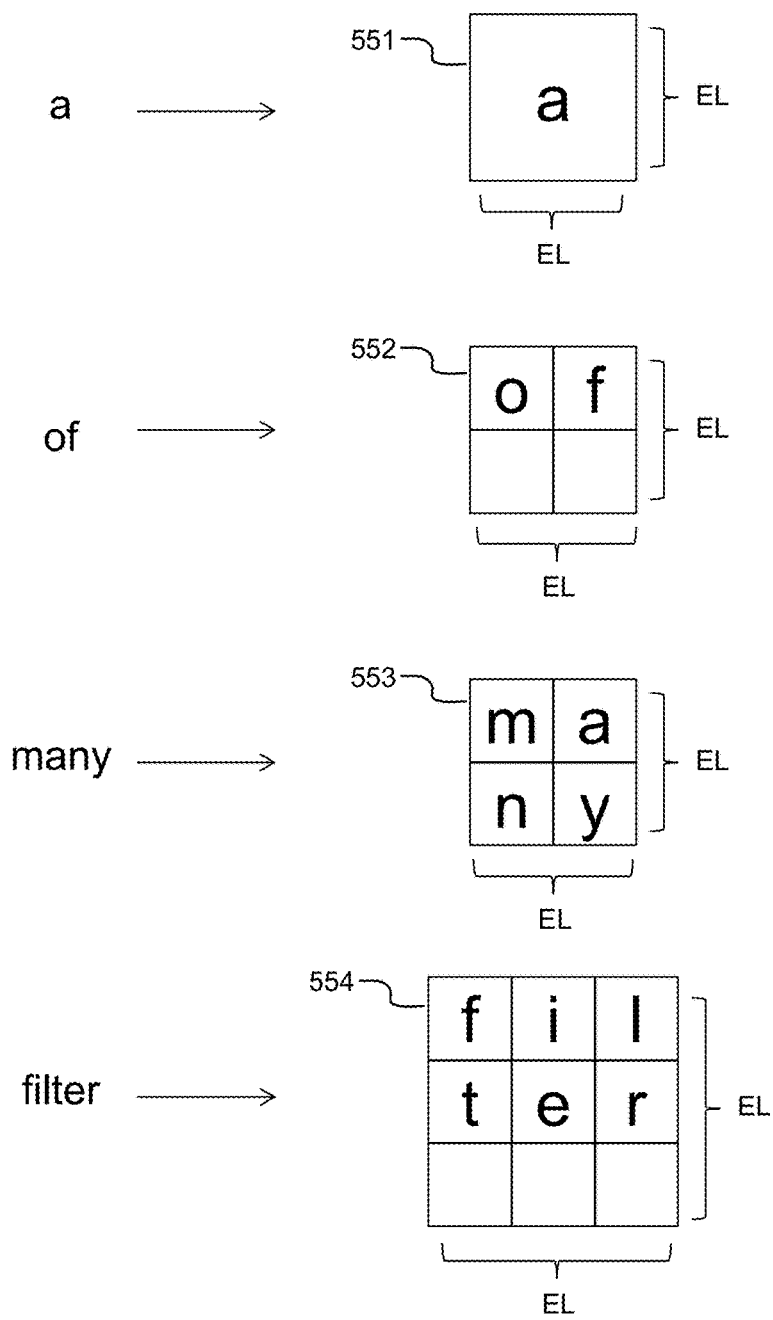
FIGS. 5C-5D are diagrams showing example schemes to form an ideogram representing a word of Latin-alphabet based language in accordance with one embodiment of the invention.
Figure 5D:
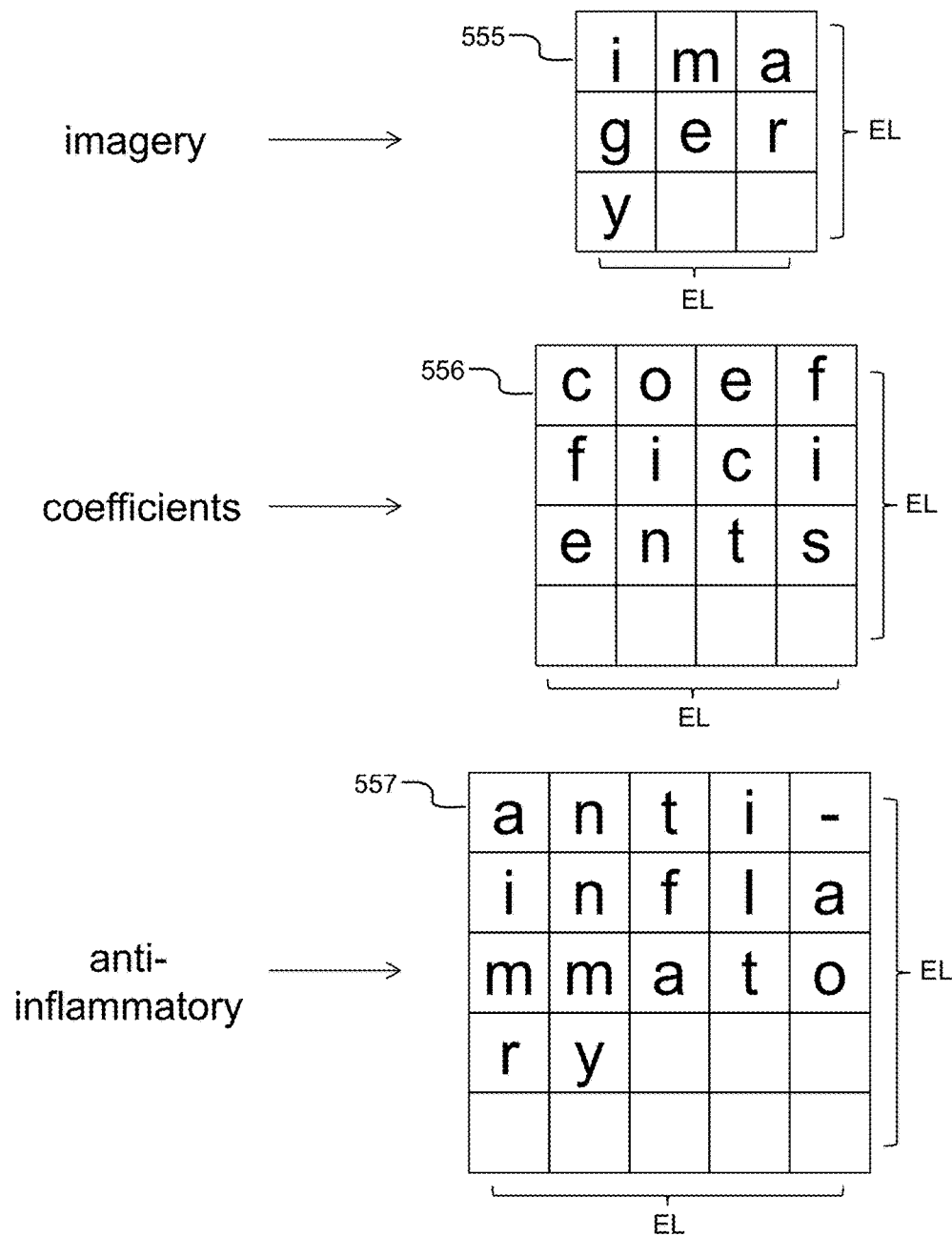
Figure 5E:
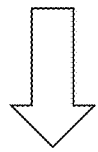
FIG. 5E is a diagram showing an example 2-D symbol formed from a string of Latin-alphabet based language texts in accordance with one embodiment of the invention.

FIG. 5A is a flowchart illustrating an example process 500 of machine learning of written Latin-alphabet based languages using a multi-layer two-dimensional symbol (e.g., 2-D symbol 564 shown in FIG. 5E). Process 500 can be implemented in software as an application module installed in at least one computer system. Process 500 may also be implemented in hardware (e.g., integrated circuits). FIG. 5B is a schematic diagram showing example Latin-alphabet based language processing via a multi-layer two-dimensional symbol with image process technique. Examples of Latin-alphabet based languages may include, but are limited to, English, German, French, Spanish, Italian, etc.

Process 500 starts at action 502 by receiving a string of Latin-alphabet based language texts 510 in a first computing system 520 having at least one application module 522 installed thereon. The first computing system 520 can be a general purpose computer capable of converting a string of Latin-alphabet based language texts 510 to a multi-layer two-dimensional (2-D) symbol 564 (i.e., an image contained in a matrix of N×N pixels of data in multiple layers). The received string contains at least one word with each word containing at least one letter of the Latin-alphabet based language. Example string 562 of English texts is shown in FIG. 5E. Each word in string 562 of English texts is converted to a square form as an ideogram (i.e., a sub-matrix containing (N/M)×(N/M) pixels) within the 2-D symbol 564. Letters within each word is arranged with a scheme shown in FIGS. 5C-5D. Each letter is also formed in a square format. As shown in the 2-D symbol 564, some of the letters may overlap each other (e.g., "attendant", "workman's", and "itself") and some may have gaps or blank pixels therebetween (not shown).

Next, at action 504, a multi-layer two-dimensional symbol 531a-531c containing M×M ideograms 532 (e.g., two-dimensional symbol 100 of FIG. 1) are formed from the received string 510 with the at least one application module 522 in the first computing system 520. Each two-dimensional symbol 531a-531c is a matrix of N×N pixels of data containing a super-character. The matrix is divided into M×M sub-matrices representing respective M×M ideograms. For Latin-alphabet based languages, each ideogram is formed from letter or letters contained in a corresponding word in the received string. Ideogram has a square format with a dimension EL letters by EL letters (i.e., row and column). EL is determined from the total number of letters (LL) contained in the corresponding word using the formula EL=Roof [Square Root(LL)]. Roof operation rounds the result of the square root of LL to the top value of the integer range indicated with [ ]. EL, LL, N and M are positive integers or whole numbers, and N is preferably a multiple of M. In other words, each ideogram occupies (N/M)×(N/M) pixels and contains maximum of EL×EL letters. Therefore each letter occupies a square area with each side containing (N/M)/EL pixels. However, when (N/M) is not exact multiple of EL (e.g., EL=3 or EL=5), the letters within an ideogram may be overlapping each other in certain situations; or the letters may be located within the ideogram with gaps in between.

Various example ideograms 551-557 formed by English words are shown in FIGS. 5C-5D. The first example ideogram 551 contains one letter "a", both LL and EL equal one. The second example ideogram 552 contains two letters "of", so LL is 2 while EL is also 2 because the square root of LL is 1.4 which is rounded to 2 (i.e., roof of the integer range). The third example ideogram 553 contains four letters "many", LL is 4 while EL is 2. The fourth example ideogram 554 contains "filter" thereby LL is 6 and EL is 3. The fifth example ideogram 555 contains "imagery" hence LL is 7 and EL is 3. The sixth example ideogram 556 contains "coefficients", LL is 12 and EL is 4. Finally, the seventh example ideogram 557 contains "anti-inflammatory" hence LL is 18 while EL is 5. The average word length of Latin-alphabet based languages is between 4 and 6 letters.

Super-character represents a meaning formed from a specific combination of a plurality of ideograms contained in the multi-layer two-dimensional symbol 564 shown in FIG. 5E, which is formed from a string 562 of English texts: "the kind of sense of humor that derives from a workman's grasp of pun and entendre and its attendant need to constantly draw attention to itself".

Finally, at action 506, the meaning of the super-character contained in the multi-layer two-dimensional symbol 531a-531c is learned in a second computing system 540 by using an image processing technique 538 to classify the multi-layer two-dimensional symbol 531a-531c, which is formed in the first computing system 520 and transmitted to the second computing system 540. The second computing system 540 is capable of image processing of imagery data such as the multi-layer two-dimensional symbol 564.

Transmitting the multi-layer 2-D symbol 531a-531c can be performed with many well-known manners, for example, through a network either wired or wireless.

In one embodiment, the first computing system 520 and the second computing system 540 are the same computing system (not shown).

In yet another embodiment, the first computing system 520 is a general-purpose computing system while the second computing system 540 is a CNN based computing system 400 implemented as integrated circuits on a semi-conductor chip shown in FIG. 4A.

The image processing technique 538 includes predefining a set of categories 542 (e.g., "Category-1", "Category-2", . . . "Category-X" shown in FIG. 5B). As a result of performing the image processing technique 538, respective probabilities 544 of the categories are determined for associating each of the predefined categories 542 with the meaning of the super-character. In the example shown in FIG. 5B, the highest probability of 88.08 percent is shown for "Category-2". In other words, the multi-layer two-dimensional symbol 531*a*-531*c* contains a super-character whose meaning has a probability of 88.08 percent associated with "Category-2" amongst all the predefined categories 544.

Figure 7:
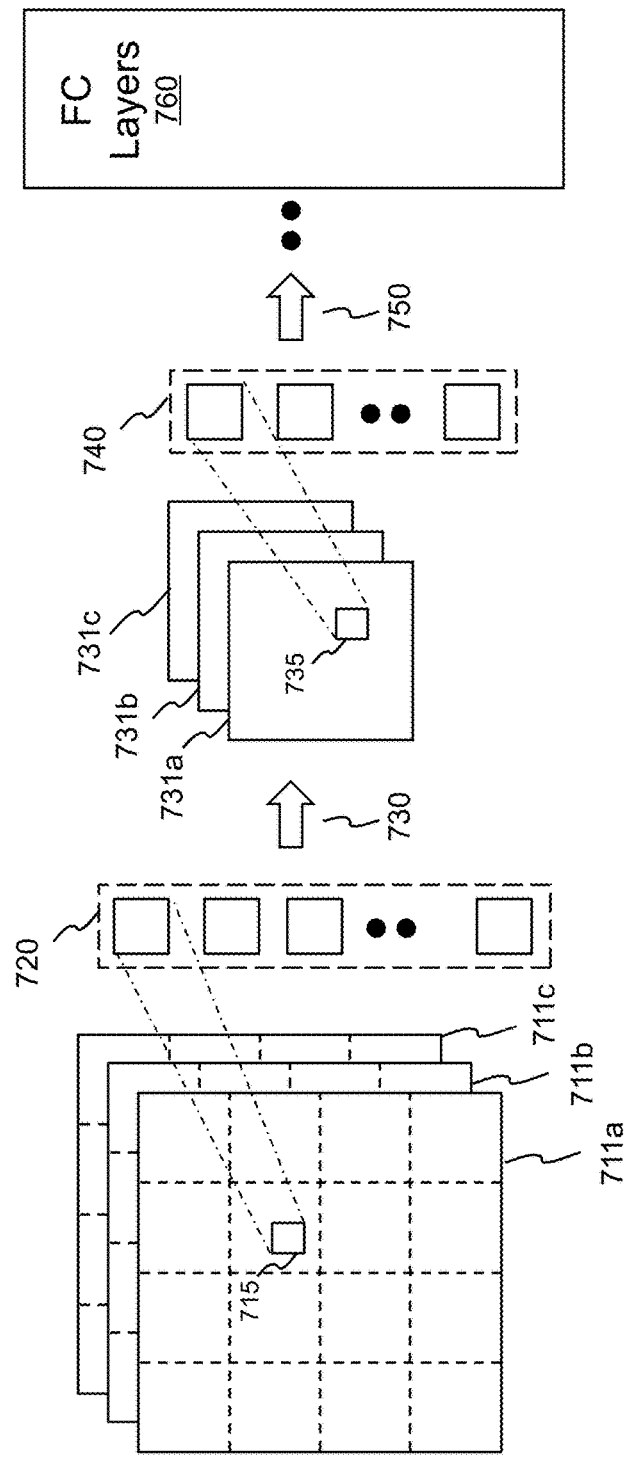
FIG. 7 is a schematic diagram showing an example image processing technique based on convolutional neural networks in accordance with an embodiment of the invention.

In one embodiment, image processing technique 538 comprises example convolutional neural networks shown in FIG. 7.

Figure 6A:
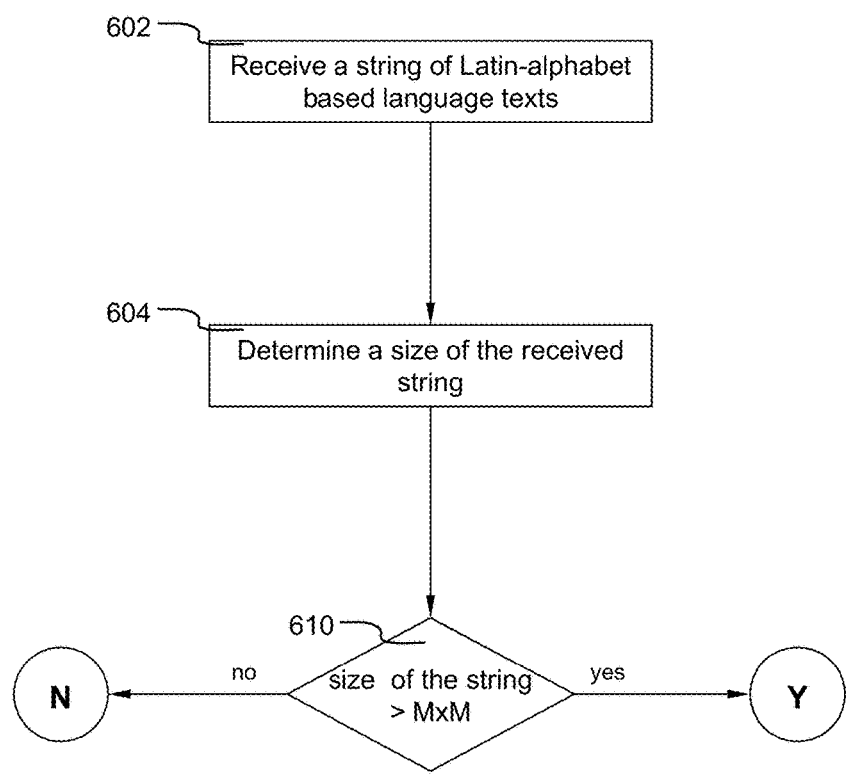
FIGS. 6A-6C are collectively a flowchart illustrating an example process of forming a two-dimensional symbol containing multiple ideograms from a string of Latin-alphabet based language texts in accordance with an embodiment of the invention.
Figure 6B:
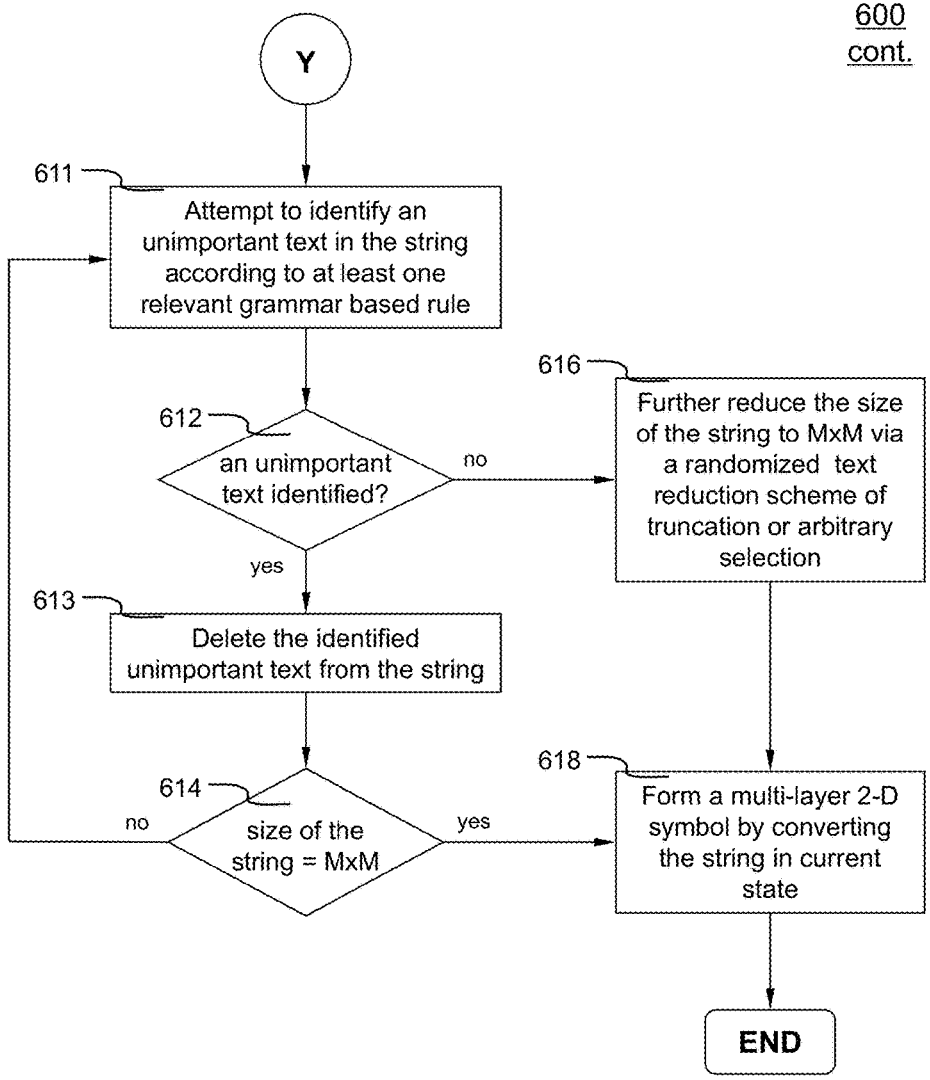
Figure 6C:
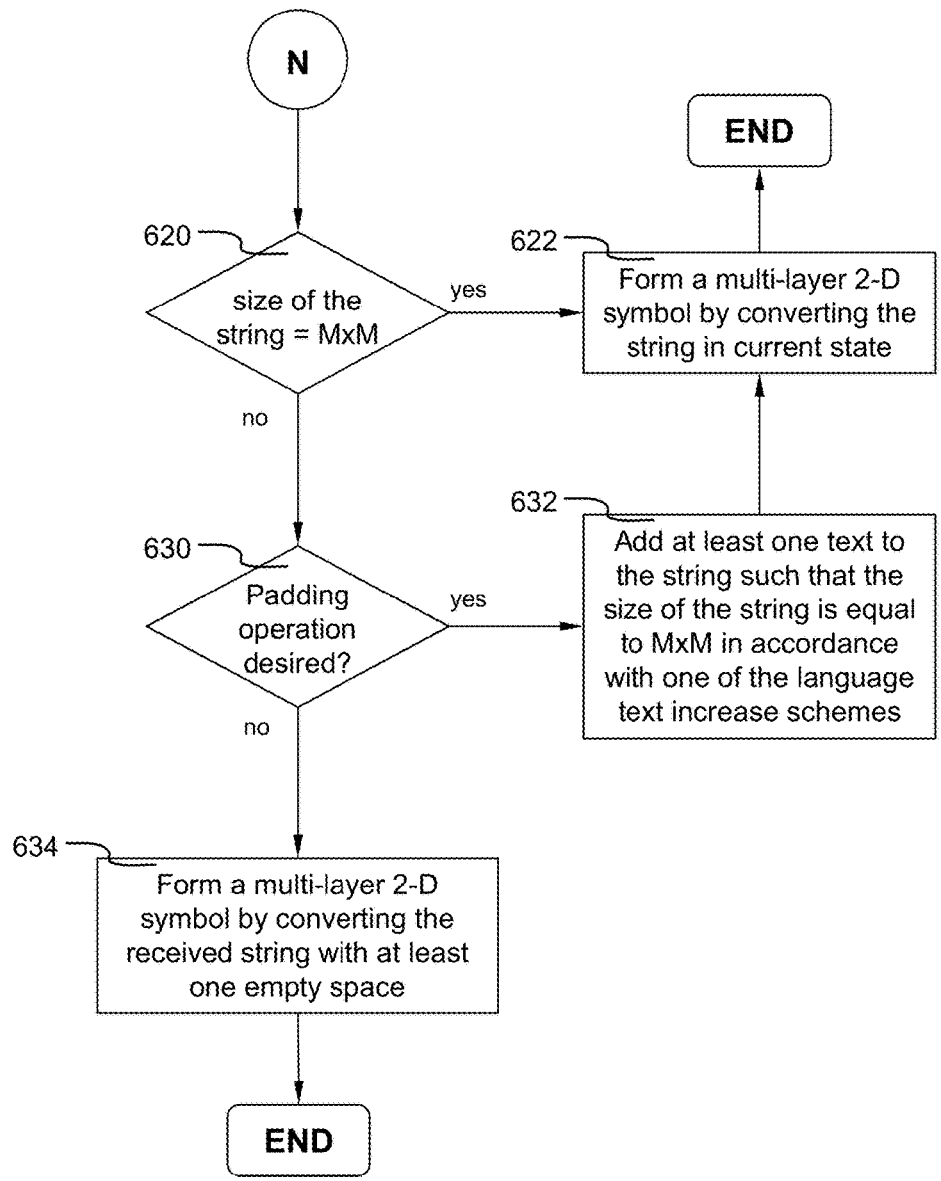

FIGS. 6A-6C are collectively a flowchart illustrating an example process 600 of forming a two-dimensional (2-D) symbol containing multiple ideograms from a string of Latin-alphabet based language texts in accordance with an embodiment of the invention. Process 600 can be implemented in software as an application module installed in a computer system. Process 600 can also be implemented in hardware (e.g., integrated circuit).

Process 600 starts at action 602 by receiving a string of Latin-alphabet based language texts in a computing system having at least one application module installed thereon. An example application module is a software that contains instructions for the computing system to perform the actions and decisions set forth in process 600. The string of Latin-alphabet based language texts may include, but are not necessarily limited to, logosyllabic characters, numerals, special characters, western languages based on Latin letters, etc. The string of Latin-alphabet based language texts can be inputted to the computing system via various well-known manners, for example, keyboard, mouse, voice-to-text, etc.

Next, at action 604, a size of the received string of Latin-alphabet based language texts is determined. Then at decision 610, it is determined whether the size is greater than M×M (i.e., the maximum number of ideograms in the two-dimensional symbol). In one embodiment, M is 4 and M×M is therefore 16. In another embodiment, M is 8 and M×M is then 64.

When decision 610 is true, the received string is too large to be fit into the 2-D symbol and must be first reduced in accordance with at least one language text reduction scheme described below.

Process 600 follows the 'yes' branch to action 611. Process 600 attempts to identify an unimportant text in the string according to at least one relevant grammar based rule. The relevant grammar based rule is associated with the received string of Latin-alphabet based language texts. For example, when the Latin-alphabet based language is English, the relevant grammar is the English grammar. Next, at decision 612, it is determined whether an unimportant text is identified or not. If 'yes', at action 613, the identified unimportant text is deleted from the string, and therefore the size of the string is reduced by one. At decision 614, the size of the string is determined if it is equal to M×M. If not, process 600 goes back to repeat the loop of action 611, decision 612, action 613 and decision 614. If decision 614 is true, process 600 ends after performing action 618, in which a multi-layer 2-D symbol is formed by converting the string in its current state (i.e., may have one or more unimportant texts deleted).

Used herein the term "unimportant texts" represent "stop words" in natural language (e.g., Latin-alphabet based languages) processing. Stop words are words filtered out before or after processing of natural language data(text). Stop words usually refer to the most common words in a language, There is no single universal list of stop words used by all natural language processing tools, and indeed not all tools even use such a list. Some tools specifically avoid removing these stop words to support phrase search. Examples of unimportant texts for Latin-alphabet based languages may include, but are not limited to, punctuation marks, modal particles, articles, etc.

During the aforementioned loop 611-614, if there is no more unimportant text in the received string, decision 612 becomes 'no'. Process 600 moves to action 616 to further reduce the size of the string to M×M via a randomized text reduction scheme, which can be truncation or arbitrary selection. At action 618, a multi-layer 2-D symbol is formed by converting the string in its current state. Process 600 ends thereafter.

The randomized text reduction scheme and the aforementioned scheme of deleting unimportant text are referred to as the at least one language text reduction scheme.

Referring back to decision 610, if it is false, process 600 follows the 'no' branch to decision 620. If the size of the received string is equal to M×M, decision 620 is true. Process 600 moves to action 622, in which a multi-layer 2-D symbol is formed by converting the the received string. Process 600 ends thereafter.

If decision 620 is false (i.e., the size of the received string is less than M×M), process 600 moves to another decision 630, in which it is determined whether a padding operation of the 2-D symbol is desired. If 'yes', at action 632, the string is padded with at least one text to increase the size of the string to M×M in accordance with at least one language text increase scheme. In other words, at least one text is added to the string such that the size of the string is equal to M×M. In one embodiment, the language text increase scheme requires one or more key texts be identified from the received string first. Then one or more identified key texts are repeatedly appended to the received string. In another embodiment, the language text increase scheme requires one or more texts from the receiving string be repeatedly appended to the string. Next, action 622 is performed to form a multi-layer 2-D symbol by converting the padded string (i.e., the received string plus at least one additional text). Process 600 ends thereafter.

If decision 630 is false, process 600 ends after performing action 634. A multi-layer 2-D symbol is formed by converting the received string, which has a size less than M×M. As a result, the 2-D symbol contains at least one empty space. In one embodiment, the multi-layer two-dimensional symbol 531*a*-531*c* contains three layers for red, green and blue hues. Each pixel in each layer of the two-dimension symbol contains K-bit. In one embodiment, K=8 for supporting true color, which contains 256 shades of red, green and blue. In another embodiment, K=5 for a reduced color map having 32 shades of red, green and blue.

FIG. 7 is a schematic diagram showing an example image processing technique based on convolutional neural networks in accordance with an embodiment of the invention.

Based on convolutional neural networks, a multi-layer two-dimensional symbol 711a-711c as input imagery data is processed with convolutions using a first set of filters or weights 720. Since the imagery data of the 2-D symbol 711a-711c is larger than the filters 720. Each corresponding overlapped sub-region 715 of the imagery data is processed. After the convolutional results are obtained, activation may be conducted before a first pooling operation 730. In one embodiment, activation is achieved with rectification performed in a rectified linear unit (ReLU). As a result of the first pooling operation 730, the imagery data is reduced to a reduced set of imagery data 731a-731c. For 2×2 pooling, the reduced set of imagery data is reduced by a factor of 4 from the previous set.

The previous convolution-to-pooling procedure is repeated. The reduced set of imagery data 731a-731c is then processed with convolutions using a second set of filters 740. Similarly, each overlapped sub-region 735 is processed. Another activation can be conducted before a second pooling operation 740. The convolution-to-pooling procedures are repeated for several layers and finally connected to a Fully-connected (FC) Layers 760. In image classification, respective probabilities 544 of predefined categories 542 can be computed in FC Layers 760.

This repeated convolution-to-pooling procedure is trained using a known dataset or database. For image classification, the dataset contains the predefined categories. A particular set of filters, activation and pooling can be tuned and obtained before use for classifying an imagery data, for example, a specific combination of filter types, number of filters, order of filters, pooling types, and/or when to perform activation. In one embodiment, the imagery data is the multi-layer two-dimensional symbol 711a-711c, which is form from a string of Latin-alphabet based language texts.

In one embodiment, convolutional neural networks are based on a Visual Geometry Group (VGG16) architecture neural nets.

Figure 8:
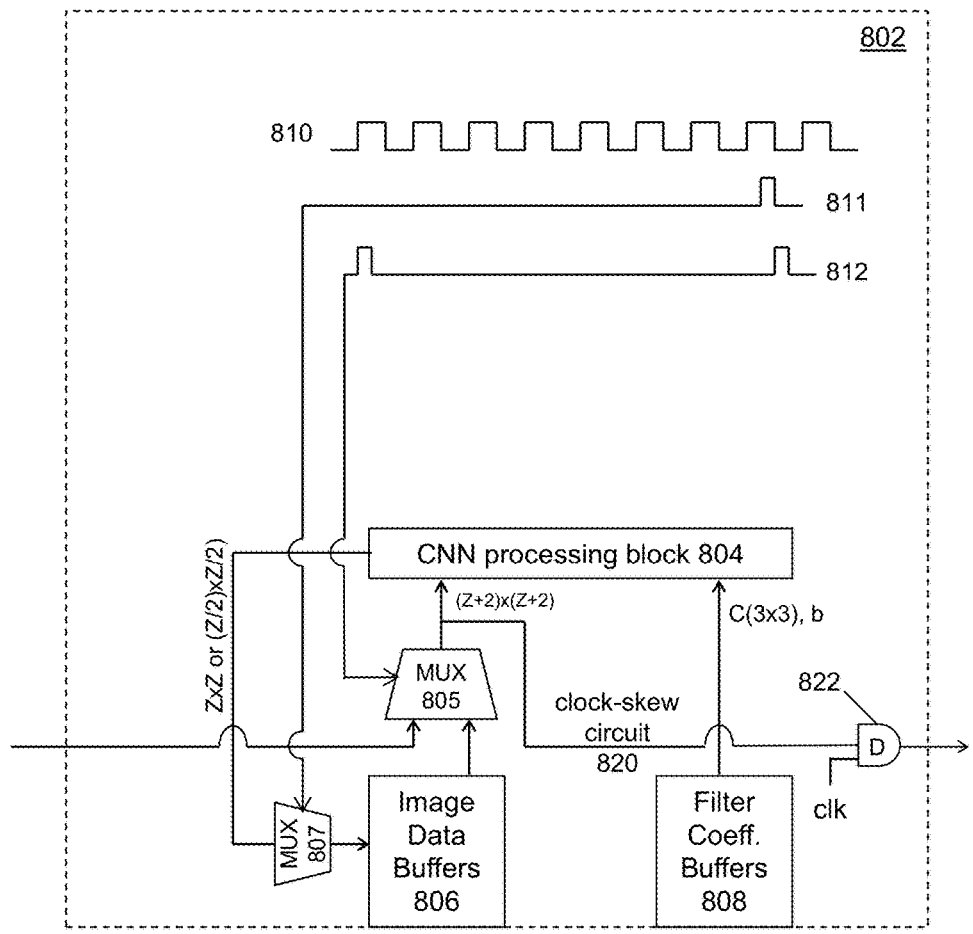
FIG. 8 is a diagram showing an example CNN processing engine in a CNN based integrated circuit, according to one embodiment of the invention.

More details of a CNN processing engine 802 in a CNN based integrated circuit are shown in FIG. 8. A CNN processing block 804 contains digital circuitry that simultaneously obtains Z×Z convolution operations results by performing 3×3 convolutions at Z×Z pixel locations using imagery data of a (Z+2)-pixel by (Z+2)-pixel region and corresponding filter coefficients from the respective memory buffers. The (Z+2)-pixel by (Z+2)-pixel region is formed with the Z×Z pixel locations as an Z-pixel by Z-pixel central portion plus a one-pixel border surrounding the central portion. Z is a positive integer. In one embodiment, Z equals to 14 and therefore, (Z+2) equals to 16, Z×Z equals to 14×14=196, and Z/2 equals 7.

Figure 9:
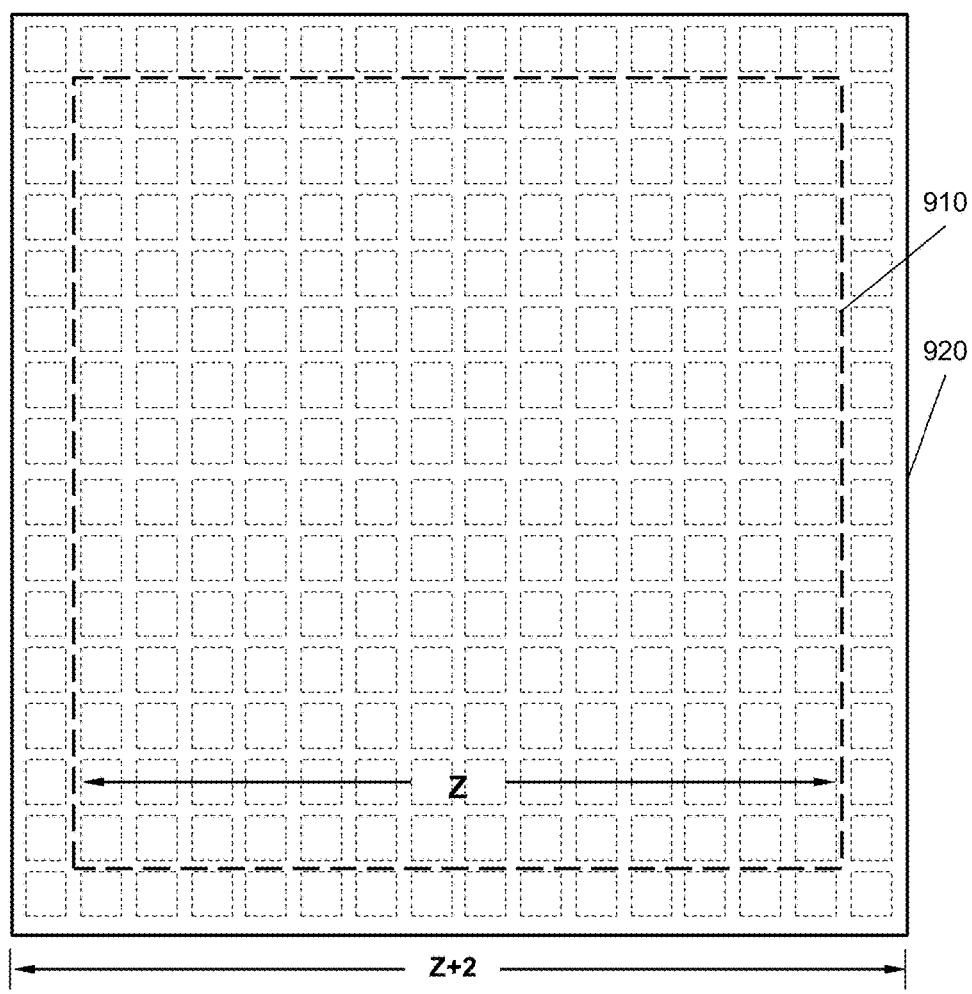
FIG. 9 is a diagram showing an example imagery data region within the example CNN processing engine of FIG. 8, according to an embodiment of the invention.

FIG. 9 is a diagram showing a diagram representing (Z+2)-pixel by (Z+2)-pixel region 910 with a central portion of Z×Z pixel locations 920 used in the CNN processing engine 802.

In order to achieve faster computations, few computational performance improvement techniques have been used and implemented in the CNN processing block 804. In one embodiment, representation of imagery data uses as few bits as practical (e.g., 5-bit representation). In another embodiment, each filter coefficient is represented as an integer with a radix point. Similarly, the integer representing the filter coefficient uses as few bits as practical (e.g., 12-bit representation). As a result, 3×3 convolutions can then be performed using fixed-point arithmetic for faster computations.

Each 3×3 convolution produces one convolution operations result, Out(m, n), based on the following formula:

$$\text{Out}(m, n) = \sum_{1 \le i,j \le 3} \text{In}(m, n, i, j) \times C(i, j) - b \qquad (1)$$

where:
- m, n are corresponding row and column numbers for identifying which imagery data (pixel) within the (Z+2)-pixel by (Z+2)-pixel region the convolution is performed;
- In(m,n,i,j) is a 3-pixel by 3-pixel area centered at pixel location (m, n) within the region;
- C(i, j) represents one of the nine weight coefficients C(3×3), each corresponds to one of the 3-pixel by 3-pixel area;
- b represents an offset coefficient; and
- j are indices of weight coefficients C(i, j).

Each CNN processing block 804 produces Z×Z convolution operations results simultaneously and, all CNN processing engines perform simultaneous operations. In one embodiment, the 3×3 weight or filter coefficients are each 12-bit while the offset or bias coefficient is 16-bit or 18-bit.

Figure 10A:
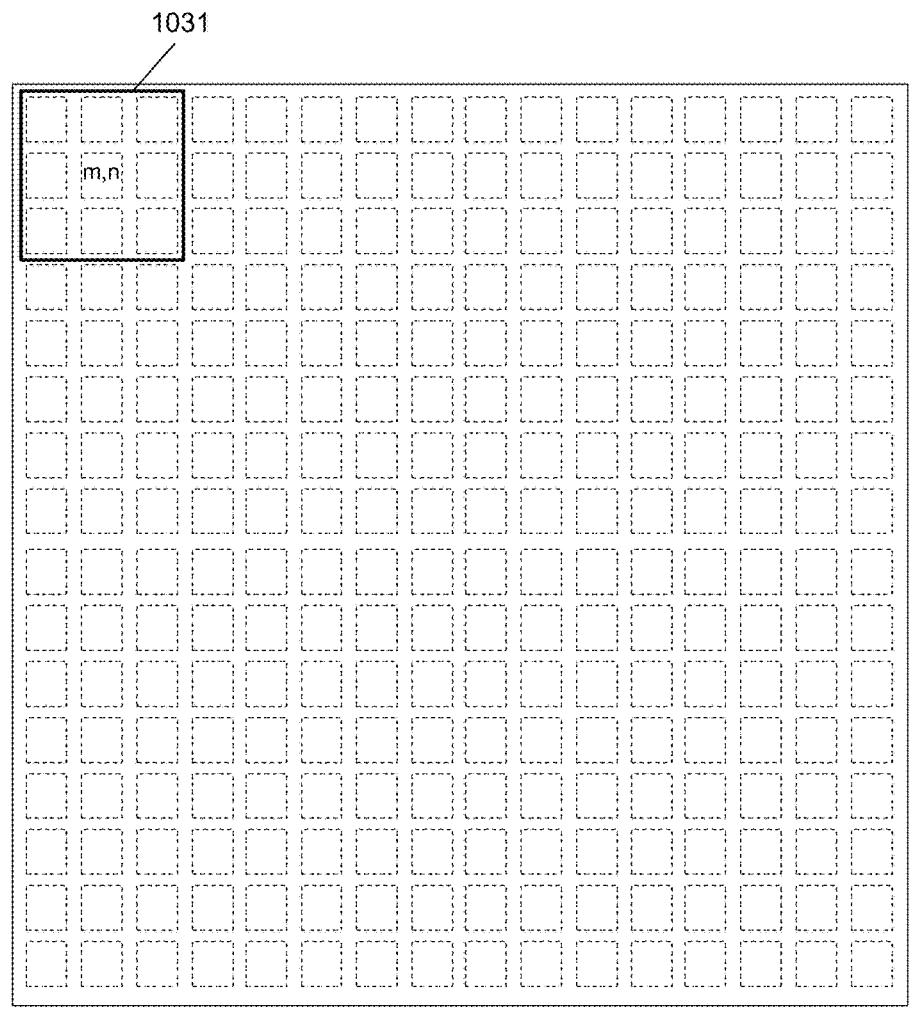
FIGS. 10A-10C are diagrams showing three example pixel locations within the example imagery data region of FIG. 9, according to an embodiment of the invention.
Figure 10B:
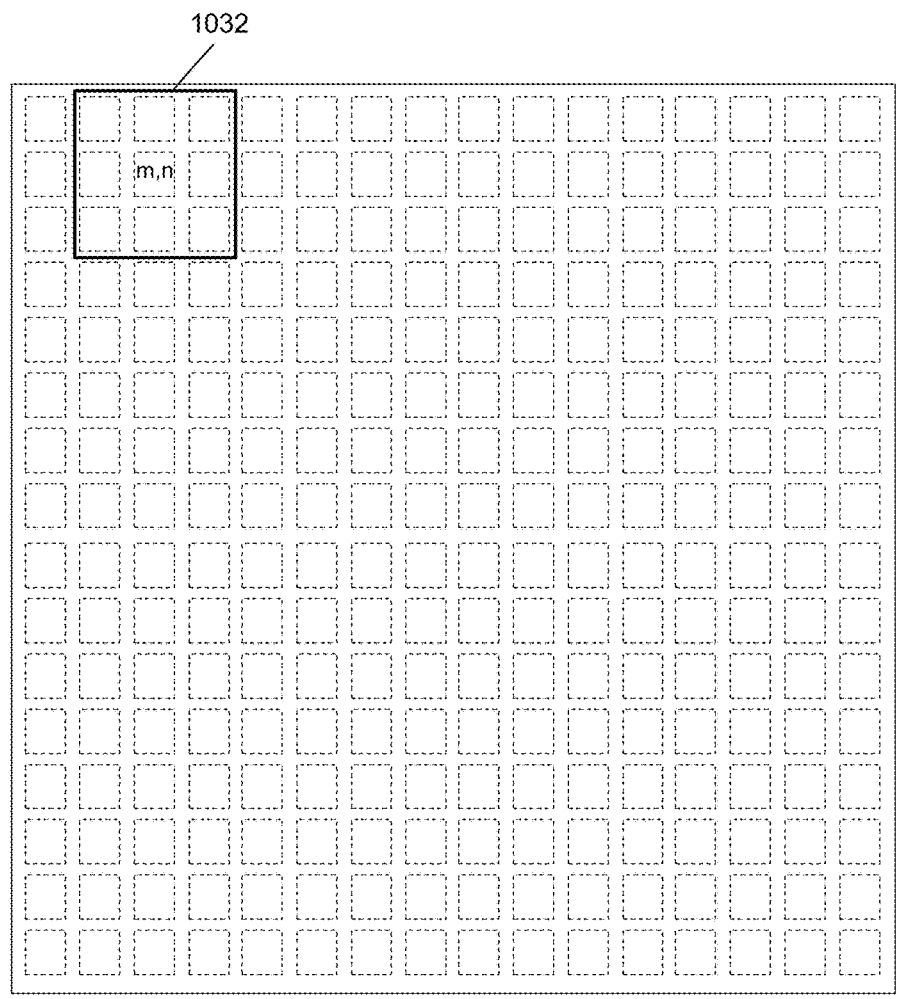
Figure 10C:
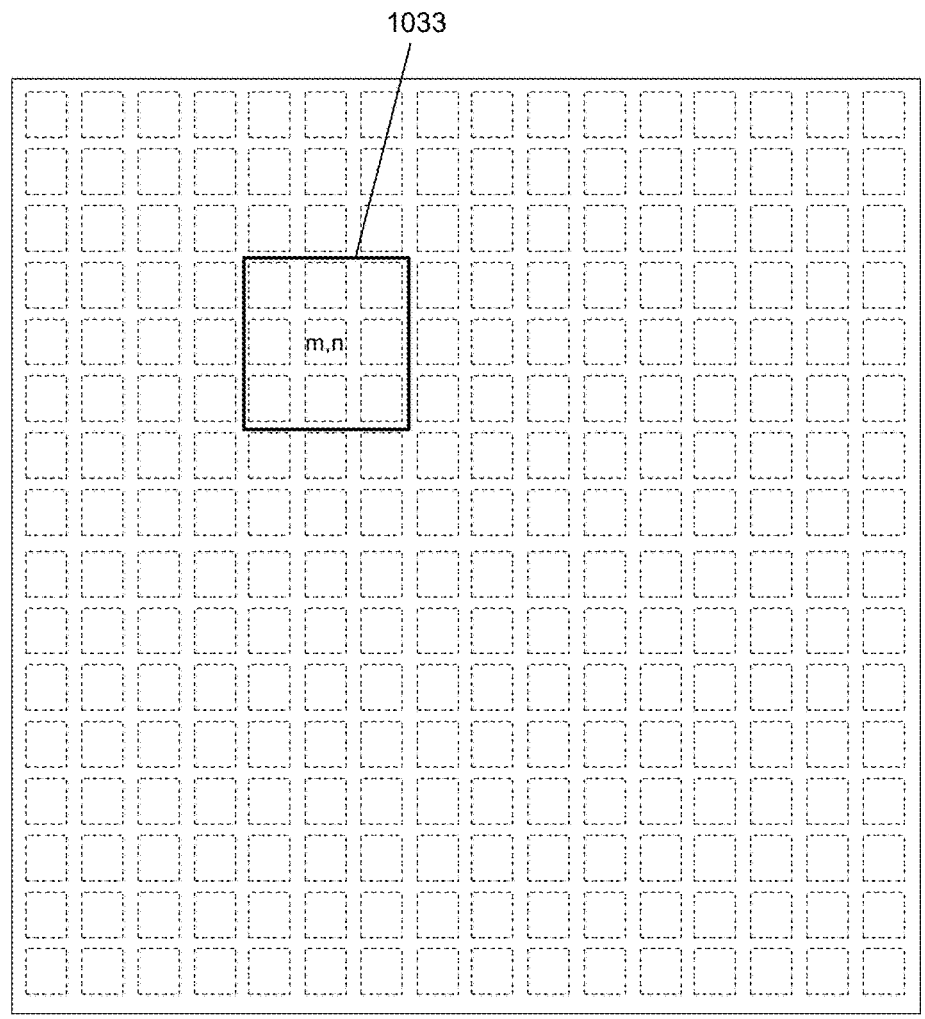

FIGS. 10A-10C show three different examples of the Z×Z pixel locations. The first pixel location 1031 shown in FIG. 10A is in the center of a 3-pixel by 3-pixel area within the (Z+2)-pixel by (Z+2)-pixel region at the upper left corner. The second pixel location 1032 shown in FIG. 10B is one pixel data shift to the right of the first pixel location 1031. The third pixel location 1033 shown in FIG. 10C is a typical example pixel location. Z×Z pixel locations contain multiple overlapping 3-pixel by 3-pixel areas within the (Z+2)-pixel by (Z+2)-pixel region.

Figure 11:
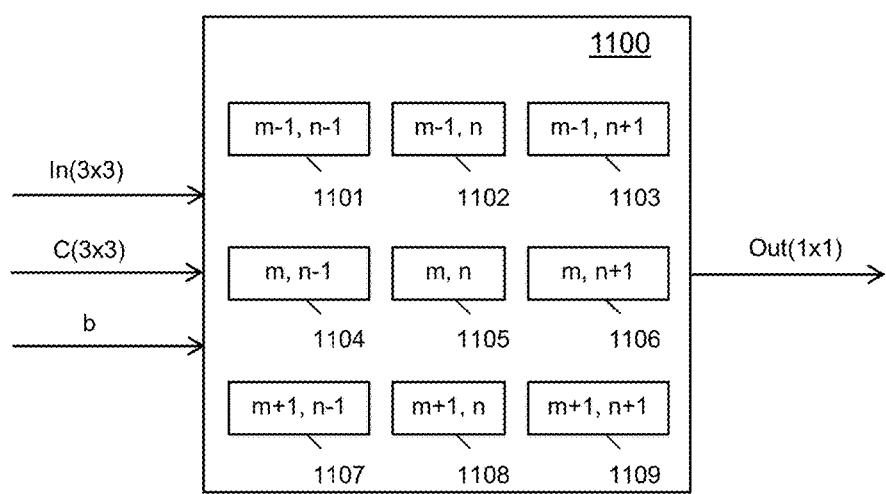
FIG. 11 is a diagram illustrating an example data arrangement for performing 3×3 convolutions at a pixel location in the example CNN processing engine of FIG. 8, according to one embodiment of the invention.

To perform 3×3 convolutions at each sampling location, an example data arrangement is shown in FIG. 11. Imagery data (i.e., In(3×3)) and filter coefficients (i.e., weight coefficients C(3×3) and an offset coefficient b) are fed into an example CNN 3×3 circuitry 1100. After 3×3 convolutions operation in accordance with Formula (1), one output result (i.e., Out(1×1)) is produced. At each sampling location, the imagery data In(3×3) is centered at pixel coordinates (m, n) 1105 with eight immediate neighbor pixels 1101-1104, 1106-1109.

Imagery data are stored in a first set of memory buffers 806, while filter coefficients are stored in a second set of memory buffers 808. Both imagery data and filter coefficients are fed to the CNN block 804 at each clock of the digital integrated circuit. Filter coefficients (i.e., C(3×3) and b) are fed into the CNN processing block 804 directly from the second set of memory buffers 808. However, imagery data are fed into the CNN processing block 804 via a multiplexer MUX 805 from the first set of memory buffers 806. Multiplexer 805 selects imagery data from the first set of memory buffers based on a clock signal (e.g., pulse 812).

Otherwise, multiplexer MUX 805 selects imagery data from a first neighbor CNN processing engine (from the left side of FIG. 8 not shown) through a clock-skew circuit 820.

At the same time, a copy of the imagery data fed into the CNN processing block 804 is sent to a second neighbor CNN processing engine (to the right side of FIG. 8 not shown) via the clock-skew circuit 820. Clock-skew circuit 820 can be achieved with known techniques (e.g., a D flip-flop 822).

After 3×3 convolutions for each group of imagery data are performed for predefined number of filter coefficients, convolution operations results Out(m, n) are sent to the first set of memory buffers via another multiplex MUX 807 based on another clock signal (e.g., pulse 811). An example clock cycle 810 is drawn for demonstrating the time relationship between pulse 811 and pulse 812. As shown pulse 811 is one clock before pulse 812, as a result, the 3×3 convolution operations results are stored into the first set of memory buffers after a particular block of imagery data has been processed by all CNN processing engines through the clock-skew circuit 820.

After the convolution operations result Out(m, n) is obtained from Formula (1), activation procedure may be performed. Any convolution operations result, Out(m, n), less than zero (i.e., negative value) is set to zero. In other words, only positive value of output results are kept. For example, positive output value 10.5 retains as 10.5 while −2.3 becomes 0. Activation causes non-linearity in the CNN based integrated circuits.

If a 2×2 pooling operation is required, the Z×Z output results are reduced to (Z/2)×(Z/2). In order to store the (Z/2)×(Z/2) output results in corresponding locations in the first set of memory buffers, additional bookkeeping techniques are required to track proper memory addresses such that four (Z/2)×(Z/2) output results can be processed in one CNN processing engine.

Figure 12A:
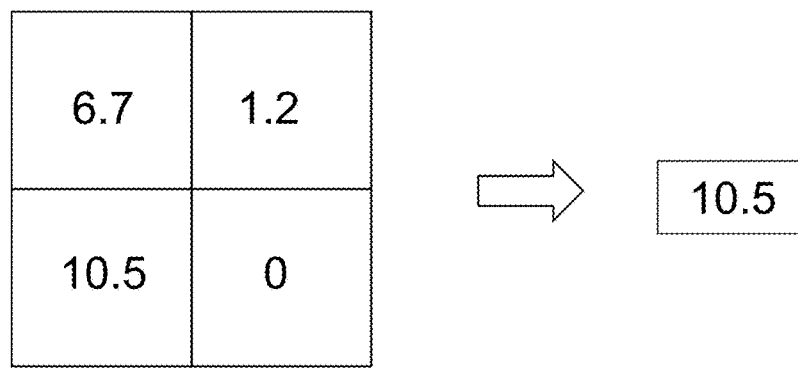
FIGS. 12A-12B are diagrams showing two example 2×2 pooling operations according to an embodiment of the invention.
Figure 12B:
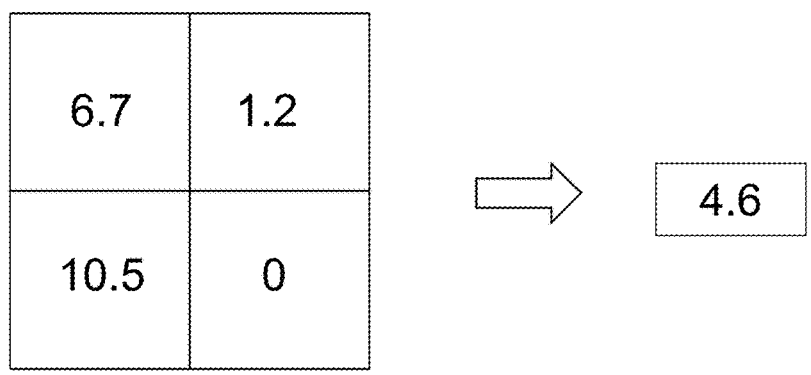
Figure 13:
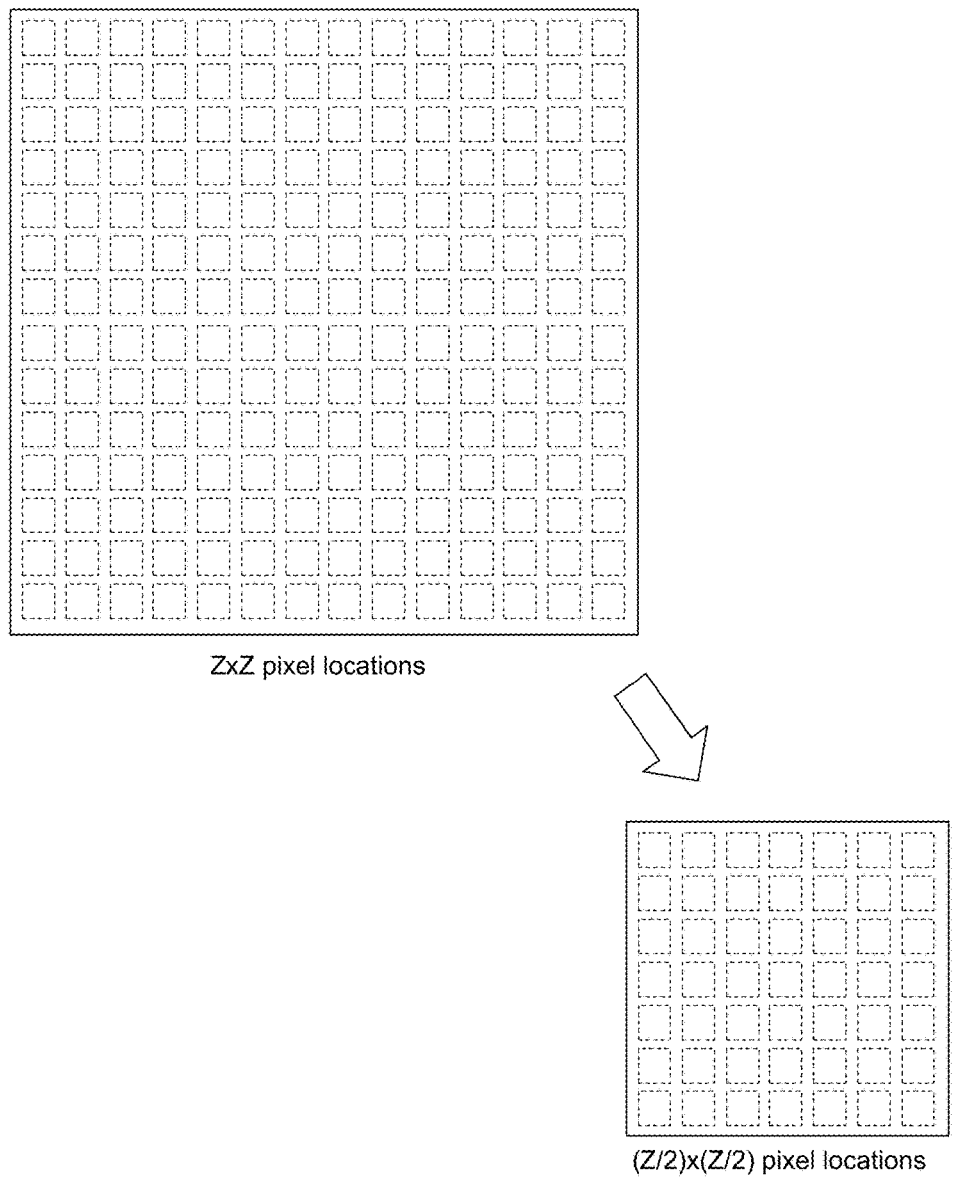
FIG. 13 is a diagram illustrating a 2×2 pooling operation of an imagery data in the example CNN processing engine of FIG. 8, according to one embodiment of the invention.

To demonstrate a 2×2 pooling operation, FIG. 12A is a diagram graphically showing first example output results of a 2-pixel by 2-pixel block being reduced to a single value 10.5, which is the largest value of the four output results. The technique shown in FIG. 12A is referred to as "max pooling". When the average value 4.6 of the four output results is used for the single value shown in FIG. 12B, it is referred to as "average pooling". There are other pooling operations, for example, "mixed max average pooling" which is a combination of "max pooling" and "average pooling". The main goal of the pooling operation is to reduce size of the imagery data being processed. FIG. 13 is a diagram illustrating Z×Z pixel locations, through a 2×2 pooling operation, being reduced to (Z/2)×(Z/2) locations, which is one fourth of the original size.

Figure 14A:
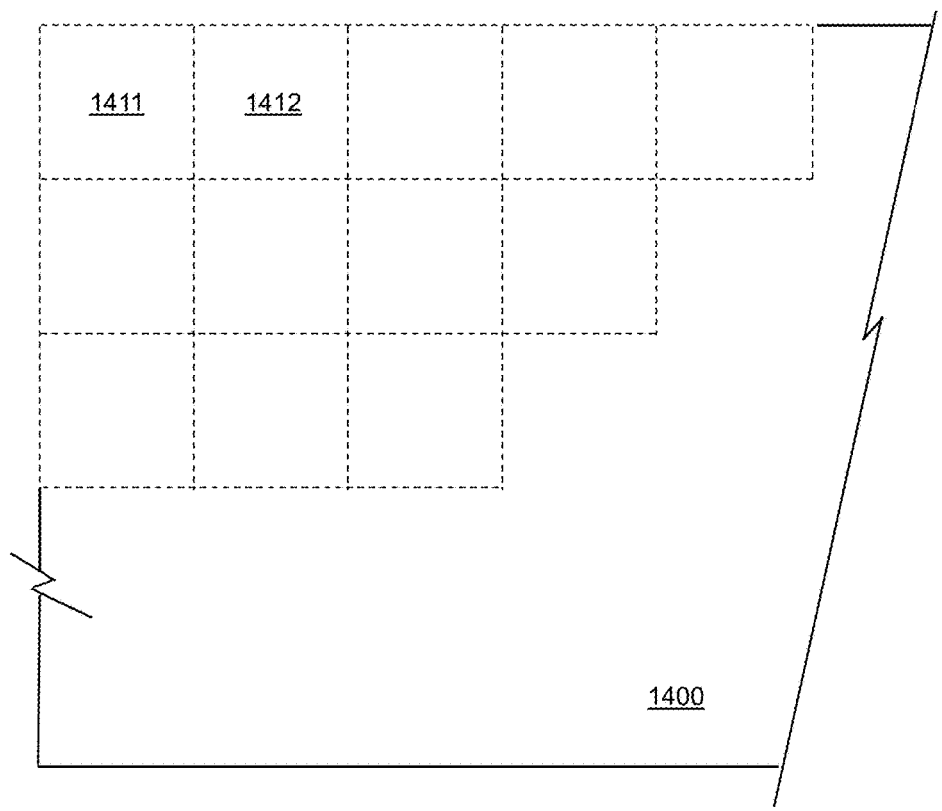
FIGS. 14A-14C are diagrams illustrating various examples of imagery data region within an input image, according to one embodiment of the invention.

An input image generally contains a large amount of imagery data. In order to perform image processing operations, an example input image 1400 (e.g., a two-dimensional symbol 100 of FIG. 1) is partitioned into Z-pixel by Z-pixel blocks 1411-1412 as shown in FIG. 14A. Imagery data associated with each of these Z-pixel by Z-pixel blocks is then fed into respective CNN processing engines. At each of the Z×Z pixel locations in a particular Z-pixel by Z-pixel block, 3×3 convolutions are simultaneously performed in the corresponding CNN processing block.

Although the invention does not require specific characteristic dimension of an input image, the input image may be required to resize to fit into a predefined characteristic dimension for certain image processing procedures. In an embodiment, a square shape with $(2^L \times Z)$-pixel by $(2^L \times Z)$-pixel is required. L is a positive integer (e.g., 1, 2, 3, 4, etc.). When Z equals 14 and L equals 4, the characteristic dimension is 224. In another embodiment, the input image is a rectangular shape with dimensions of $(2^I \times Z)$-pixel and $(2^J \times Z)$-pixel, where I and J are positive integers.

Figure 14B:
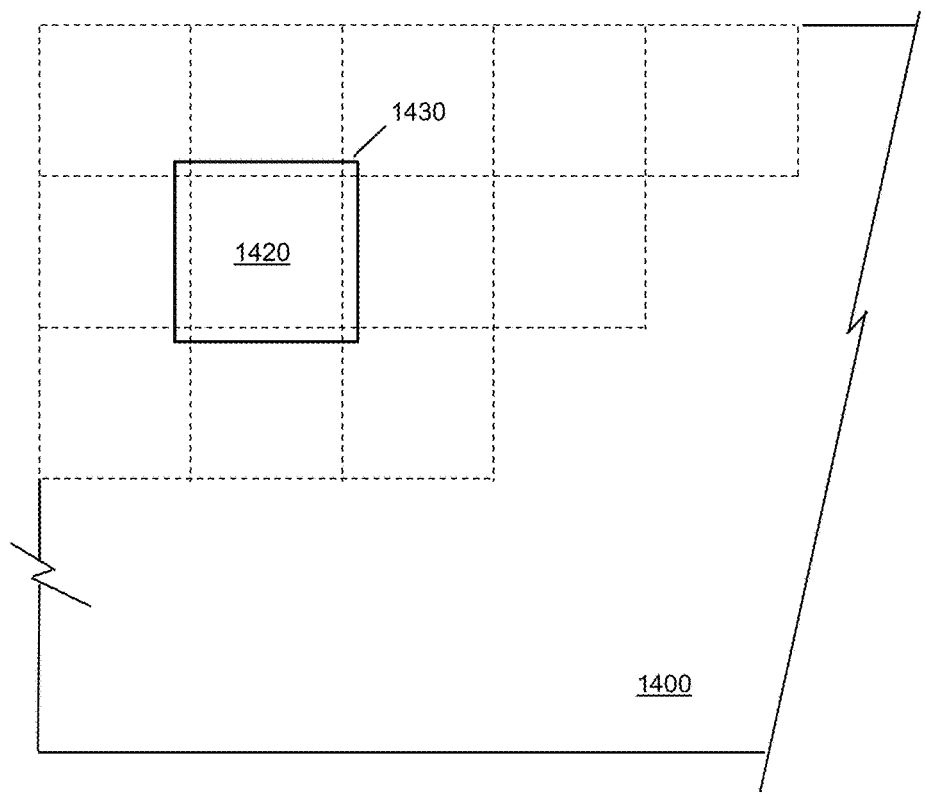

In order to properly perform 3×3 convolutions at pixel locations around the border of a Z-pixel by Z-pixel block, additional imagery data from neighboring blocks are required. FIG. 14B shows a typical Z-pixel by Z-pixel block 1420 (bordered with dotted lines) within a (Z+2)-pixel by (Z+2)-pixel region 1430. The (Z+2)-pixel by (Z+2)-pixel region is formed by a central portion of Z-pixel by Z-pixel from the current block, and four edges (i.e., top, right, bottom and left) and four corners (i.e., top-left, top-right, bottom-right and bottom-left) from corresponding neighboring blocks.

Figure 14C:
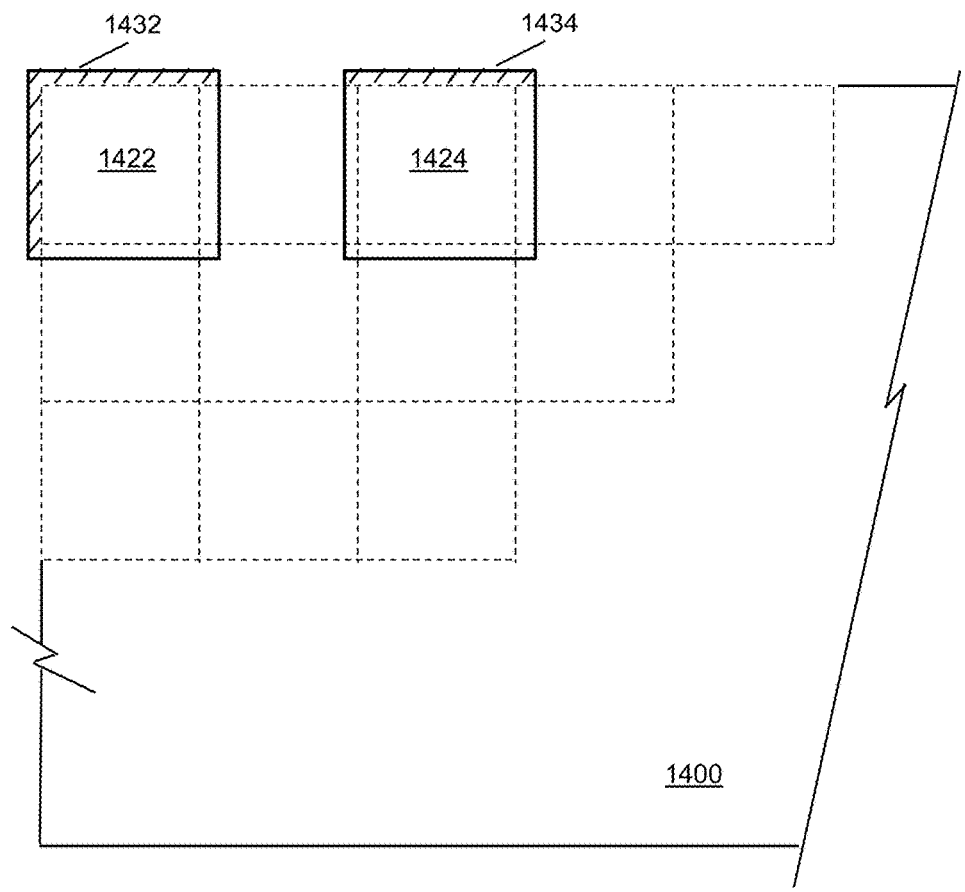

FIG. 14C shows two example Z-pixel by Z-pixel blocks 1422-1424 and respective associated (Z+2)-pixel by (Z+2)-pixel regions 1432-1434. These two example blocks 1422-1424 are located along the perimeter of the input image. The first example Z-pixel by Z-pixel block 1422 is located at top-left corner, therefore, the first example block 1422 has neighbors for two edges and one corner. Value "0"s are used for the two edges and three corners without neighbors (shown as shaded area) in the associated (Z+2)-pixel by (Z+2)-pixel region 1432 for forming imagery data. Similarly, the associated (Z+2)-pixel by (Z+2)-pixel region 1434 of the second example block 1424 requires "0"s be used for the top edge and two top corners. Other blocks along the perimeter of the input image are treated similarly. In other words, for the purpose to perform 3×3 convolutions at each pixel of the input image, a layer of zeros ("0" s) is added outside of the perimeter of the input image. This can be achieved with many well-known techniques. For example, default values of the first set of memory buffers are set to zero. If no imagery data is filled in from the neighboring blocks, those edges and corners would contain zeros.

Figure 15:
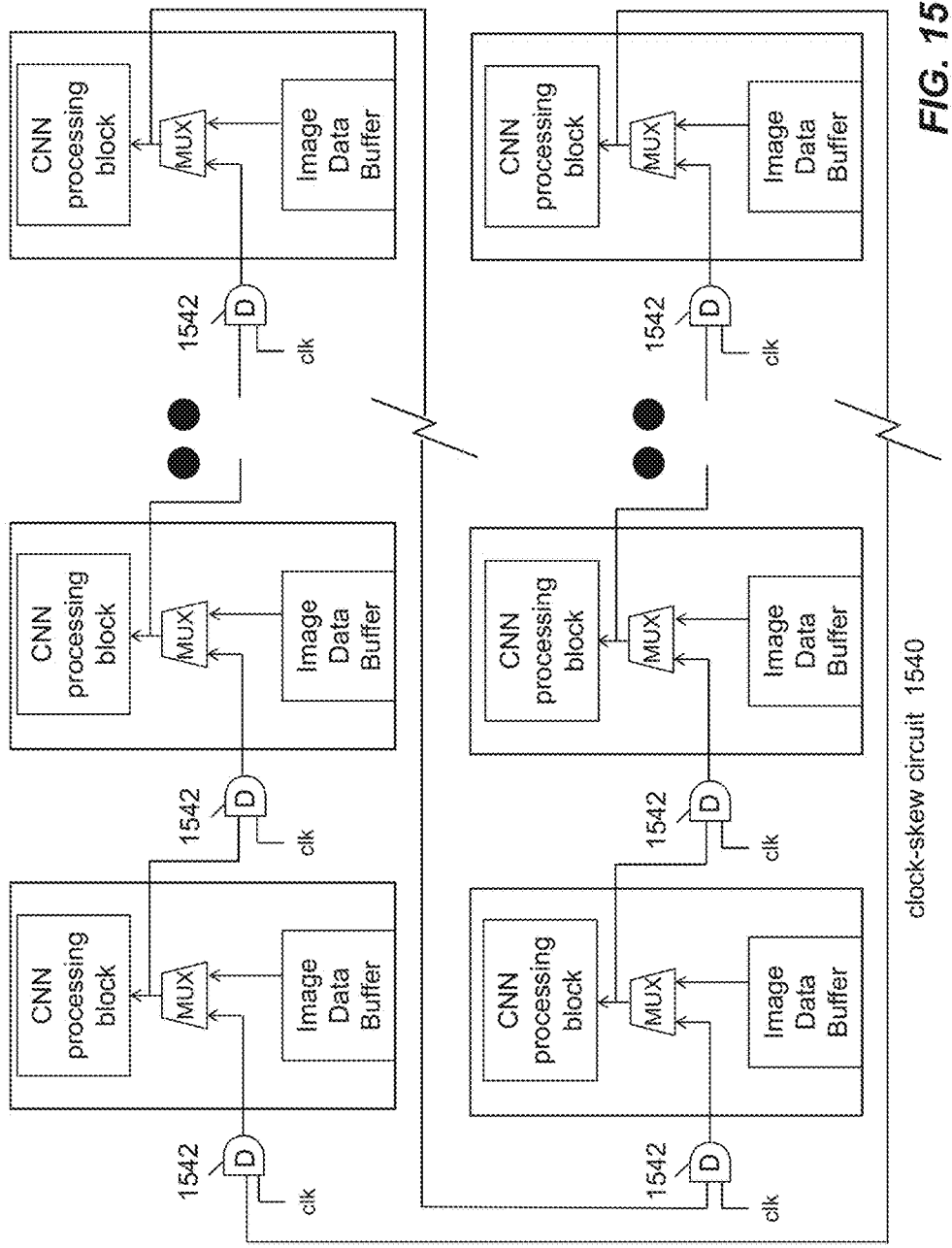
FIG. 15 is a diagram showing a plurality of CNN processing engines connected as a loop via an example clock-skew circuit in accordance of an embodiment of the invention.

When more than one CNN processing engine is configured on the integrated circuit. The CNN processing engine is connected to first and second neighbor CNN processing engines via a clock-skew circuit. For illustration simplicity, only CNN processing block and memory buffers for imagery data are shown. An example clock-skew circuit 1540 for a group of example CNN processing engines are shown in FIG. 15.

CNN processing engines connected via the second example clock-skew circuit 1540 to form a loop. In other words, each CNN processing engine sends its own imagery data to a first neighbor and, at the same time, receives a second neighbor's imagery data. Clock-skew circuit 1540 can be achieved with well-known manners. For example, each CNN processing engine is connected with a D flip-flop 1542.

Although the invention has been described with reference to specific embodiments thereof, these embodiments are merely illustrative, and not restrictive of, the invention. Various modifications or changes to the specifically disclosed example embodiments will be suggested to persons skilled in the art. For example, whereas the two-dimensional symbol has been described and shown with a specific example of a matrix of 224×224 pixels, other sizes may be used for achieving substantially similar objectives of the invention, for example, 896×896. Additionally, whereas maximum number of letters in one ideogram has been shown and described as 25, the invention does not limit to the maximum, for example, 36 or higher may be used. Furthermore, whereas the predefined order to form an ideogram has been shown and described as left-to-right, top-to-bottom, other ordered may be used for achieving the same, for example, bottom-to-up, right-to-left or any other consistent combinations. In summary, the scope of the invention should not be restricted to the specific example embodiments disclosed herein, and all modifications that are readily suggested to those of ordinary skill in the art should be included within the spirit and purview of this application and scope of the appended claims.

What is claimed is:

1. A method of machine learning of written Latin-alphabet based languages comprising:

receiving a string of Latin-alphabet based language texts in a first computing system having at least one application module installed thereon, the received string containing at least one word with each word formed by at least one letter of the Latin-alphabet based language;

forming, with the at least one application module in the first computing system, a multi-layer two-dimensional (2-D) symbol from the received string in accordance with a set of rules, the 2-D symbol being a matrix of N×N pixels of data that contains a super-character, the matrix being divided into M×M sub-matrices, each of the sub-matrices containing (N/M)×(N/M) pixels as one of at least one ideogram, each ideogram being formed from the at least one letter contained in a corresponding word in the received string such that said each ideogram having a square format with a dimension 'EL' letters in a row and 'EL' letters in a column, 'EL' is determined from total number of letters 'LL' contained in the corresponding word, and the super-character representing a meaning formed from a specific combination of said at least one ideogram, where 'EL', 'LL', 'N' and 'M' are positive integers, and 'N' is a multiple of 'M'; and learning the meaning of the super-character in a second computing system by using an image processing technique to classify the 2-D symbol, which is formed with the at least one application module in the first computing system and transmitted to the second computing system.

2. The method of claim 1, wherein the dimension 'EL' is determined using a formula: EL=Roof [SquareRoot(LL)], where the Roof operation rounds result of the square root to a top value of an integer range.

3. The method of claim 2, wherein the letters in the corresponding word are arranged in a predefined order to form said each ideogram.

4. The method of claim 1, wherein the set of rules comprises:

determining a size of the received string of Latin-alphabet based language texts;

if the size of the receiving string is greater than M×M, modifying the received string via at least one language text reduction scheme such that the size of the string is equal to M×M, and then converting the string to the multi-layer 2-D symbol;

if the size of the receiving string is equal to M×M, converting the received string to the multi-layer 2-D symbol;

if the size of the receiving string is less than M×M and a padding operation is desired, adding at least one text to pad the string such that the size of the string is equal to M×M in accordance with at least one language text increase scheme, and then converting the padded string to the multi-layer 2-D symbol;

otherwise, converting the received string to the multi-layer 2-D symbol, which contains at least one empty space.

5. The method of claim 4, wherein said at least one language text reduction scheme comprises deleting at least one unimportant text from the received string according to at least one relevant grammar based rule.

6. The method of claim 5, wherein the at least one relevant grammar based rule is associated with the Latin-alphabet based language.

7. The method of claim 5, wherein said at least one language text reduction scheme further comprises a randomized text reduction scheme.

8. The method of claim 7, wherein the randomized text reduction scheme further comprises truncating the string such that the size of the string is reduced to M×M.

9. The method of claim 7, wherein the randomized text reduction scheme further comprises arbitrarily selecting certain texts in the string such that the size of the string is equal to M×M.

10. The method of claim 4, wherein at least one language text increase scheme further comprises identifying one or more key texts from the received string and then repeatedly appending said one or more key texts to the string.

11. The method of claim 1, wherein the image processing technique comprises a convolutional neural networks algorithm.

12. The method of claim 11, wherein the second computing system comprises a Cellular Neural Networks or Cellular Nonlinear Networks (CNN) based computing system.

13. The method of claim 12, wherein CNN based computing system comprises a semi-conductor chip containing digital circuits dedicated for performing the convolutional neural networks algorithm.

14. The method of claim 11, wherein said using the image processing technique further comprises predefining a set of categories.

15. The method of claim 14, wherein said using the image processing technique further comprises determining a probability for associating each of the predefined categories with the meaning of the super-character.

* * * * *